US012067830B2

(12) United States Patent
Chambers et al.

(10) Patent No.: US 12,067,830 B2
(45) Date of Patent: Aug. 20, 2024

(54) RECONFIGURABLE MODULAR OVERHEAD DISPLAY ASSEMBLY FOR A GAMING SYSTEM

(71) Applicant: Aristocrat Technologies, Inc. (ATI), Las Vegas, NV (US)

(72) Inventors: Keith Chambers, Las Vegas, NV (US); Scott Hendrickson, Las Vegas, NV (US); Daniel Egar, Upper Coomera (AU); John Curtis, Biddaddaba (AU)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 0 days.

(21) Appl. No.: 17/873,014

(22) Filed: Jul. 25, 2022

(65) Prior Publication Data

US 2022/0358812 A1 Nov. 10, 2022

Related U.S. Application Data

(63) Continuation of application No. 17/039,547, filed on Sep. 30, 2020, now Pat. No. 11,436,890.

(60) Provisional application No. 63/025,764, filed on May 15, 2020, provisional application No. 62/914,184, filed on Oct. 11, 2019.

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC .............................. G07F 17/34; H05K 5/0017
See application file for complete search history.

(56) References Cited

U.S. PATENT DOCUMENTS

| | | | |
|---|---|---|---|
| D383,802 | S | 9/1997 | Levy |
| D450,096 | S | 11/2001 | Legras |
| D484,550 | S | 12/2003 | Seelig |
| D508,719 | S | 8/2005 | de Haas |
| D513,523 | S | 1/2006 | Crouch |

(Continued)

FOREIGN PATENT DOCUMENTS

| | | |
|---|---|---|
| AU | 201810719 | 5/2018 |
| AU | 201812634 | 5/2018 |

(Continued)

OTHER PUBLICATIONS

Office Action dated Jan. 18, 2022 for U.S. Appl. No. 29/739,022 (pp. 1-7).

(Continued)

*Primary Examiner* — Kevin Y Kim
(74) *Attorney, Agent, or Firm* — McAndrews, Held & Malloy, Ltd.

(57) ABSTRACT

A multi-module overhead display assembly for use with a gaming system. The multi-module overhead display assembly has a housing module releasably connected to one or more other housing modules for display of content above a game machine. A mounting structure for the releasably connected housing module is provided to be connectable to a mount system. At least one housing module comprises a controller having a processor and memory storing instructions, which, when executed, cause the processor to individually control each of the housing modules to display the content.

20 Claims, 40 Drawing Sheets

(56) References Cited

U.S. PATENT DOCUMENTS

| | | | | |
|---|---|---|---|---|
| D628,656 | S | 12/2010 | Bruzzese | |
| D629,466 | S | 12/2010 | Bruzzese | |
| D673,622 | S | 1/2013 | Wudtke | |
| D706,359 | S | 6/2014 | Wudtke | |
| 9,659,434 | B2 | 5/2017 | Bainbridge | |
| D803,323 | S | 11/2017 | Bussey | |
| D900,938 | S | 11/2020 | Lesourd | |
| D934,236 | S | 10/2021 | Domenico | |
| 2008/0067312 | A1 | 3/2008 | Allen | |
| 2015/0186097 | A1* | 7/2015 | Hall | H05K 5/0247 345/1.3 |
| 2019/0102971 | A1* | 4/2019 | Schoonmaker | F16M 11/06 |
| 2019/0287337 | A1 | 9/2019 | Shiraishi | |
| 2019/0311580 | A1 | 10/2019 | Hawkins | |
| 2019/0320543 | A1* | 10/2019 | Wand | H05K 5/0234 |
| 2020/0111290 | A1 | 4/2020 | Winston | |

FOREIGN PATENT DOCUMENTS

| | | |
|---|---|---|
| AU | 201812637 | 5/2018 |
| AU | 201812639 | 5/2018 |
| AU | 201812640 | 5/2018 |

OTHER PUBLICATIONS

Jackpot Gaming Led Display, first available May 25, 2017, www.linsnled.com [online], site visited Jan. 6, 2022], Available from internet URL: https://www.linsnled.com/jackpot-gaming-led-display-solutions.html (Year: 2017).

Notice of Allowance dated Apr. 14, 2022 for U.S. Appl. No. 29/739,022 (pp. 1-8).

Solutions for Casino Jackpot Lottery LED Screen, first available May 25, 2017, www.linsnled.com [online], site visited Jan. 6, 2022], Available from internet URL: https://www.linsnled.com/jackpot-gaming-led-display-solutions.html (Year: 2017).

Office Action dated Jan. 18, 2022 for U.S. Appl. No. 29/739,023 (pp. 1-12).

Office Action (Notice of Allowance and Fees Due (PTOL-85)) dated Apr. 6, 2022 for U.S. Appl. No. 17/039,547 (pp. 1-10).

Office Action (Notice of Allowance and Fees Due (PTOL-85)) dated May 10, 2022 for U.S. Appl. No. 17/039,547 (pp. 1-5).

Notice of Allowance dated May 27, 2022 for U.S. Appl. No. 29/739,023 (pp. 1-6).

Notice of Allowance dated Jun. 15, 2022 for U.S. Appl. No. 29/739,023 (pp. 1-2).

* cited by examiner

RECONFIGURABLE MODULAR OVERHEAD DISPLAY ASSEMBLY FOR A GAMING SYSTEM

RELATED APPLICATIONS

This patent application is a continuation of and claims priority to U.S. application Ser. No. 17/039,547, filed on Sep. 30, 2020, which claims priority to U.S. Provisional Patent Application No. 62/914,184, filed on Oct. 11, 2019, and this application also claims priority to U.S. Provisional Patent Application No. 63/025,764, filed on May 15, 2020, all of which are hereby incorporated herein by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In existing gaming systems, feature games, secondary or bonus games, may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. Accordingly, there is a continuing need for gaming machine manufacturers to develop new games in order to maintain or increase player enjoyment.

To enhance the entertainment value of the gaming machines, overhead display signages are used. Typical overhead display signage on electronic gaming machines and systems utilize consumer grade video displays, e.g., liquid crystal displays, or light-emitting diode (LED) displays. However, consumer grade video displays present several limitations, such as, having fixed configurations and dimensions once assembled, which limits flexibility and scalability of overhead display designs for gaming systems. These configurations also do not easily accommodate different electronic game machine sizes due to the fixed dimensions of the consumer grade video displays. Also, typical configurations are not easily scalable to smaller or larger size signage. These configurations also have non-zero width frames, which present visible seams between the video displays to the player or user that create a disjointed or broken presentation of imagery, which, in turn, may render the experience not satisfying.

Typical overhead display signage on electronic gaming machines and systems utilize consumer grade video displays, e.g., liquid crystal displays. However, consumer grade video displays present several limitations, such as, having fixed configurations and dimensions once assembled, which limits flexibility and scalability of overhead display designs for gaming systems. These configurations also do not easily accommodate different electronic game machine sizes due to the fixed dimensions of the consumer grade video displays. Also, typical configurations are not easily scalable to smaller or larger size signage. These configurations also have non-zero width frames, which present visible seams between the video displays to the player or user that create a disjointed or broken presentation of imagery, which, in turn, may render the experience not satisfying.

Typical signage configurations are not easily modified, whether by addition or reduction of existing overhead displays. Variable size game machines or custom game machine banks of various sizes are not easy configurable on-site with typical overhead signage. That is, reconfiguring typical signage configurations commonly requires costly and substantial dismantling and rebuilding of the existing overhead displays or signage and their corresponding support rail systems to accommodate changes. For example, when additional overhead displays are to be added to typical overhead displays, the typical overhead displays and their support rail system are dismantled, shipped back to its manufacturer, and rebuilt and repackaged with the additional overhead displays. This consumes time and imposes costs. Beyond the consumption of time and imposed costs, the downtime stands to reduce game machine availability and utilization on the floor and, thus, loss of revenues for the operator.

Further, when a signage is built, the signage is developed based on a specific monitor, LED, or size. If an operator wants to change the number of games on the floor, the operator would typically require signage changes. As mentioned above, the ability to change the size of a signage internally, or in the field, is a challenging task. In most cases, a new sign would need to be assembled and sent out to the customer, and the old sign would need to be deconstructed in the field and returned. In most cases, the returned sign would then need to be refurbished and its reuse would be limited to retuning to a casino that needs signage for the game machine specific footprint. The existing process to assemble and replace signage are costly, cumbersome and time consuming.

SUMMARY

Described herein is a multi-module overhead display assembly for content display above gaming machines and banks of gaming machines that comprise housing modules and one or more modular rail support systems to support such housing modules. The multi-panel display modules may be of different sizes to maintain size and appearance across a variety of sized gaming machines and banks of gaming machines. This enhances scalability of the multi-module overhead display assembly for use across different game cabinet platforms (e.g., size, shape and configuration) of game machines and banks of game machines. The multi-panel display modules enable different configurations of overhead displays to be formed that are easier to manufacture and assemble, and that reduce the number of parts for manufacture and inventory, and in turn, reduced costs. Further, since the modular mount systems are easily configured and/or reconfigured as well, service, other maintenance, reconfiguration and reassembly are less time consuming.

Aspects of the disclosure are directed to a multi-module overhead display assembly for use with a gaming machines and game banks. In an embodiment, a display system comprises a game machine display operable to display at least game content, and one or more, overhead, modular multi-panel displays operable to display game or non-game specific content. The multi-module overhead display assembly comprises one or more housing modules. Each of the housing modules contains one or more display boards or panels. A mounting system or support may be positioned to receive the one or more housing modules for to display content above the game machine display. The housing modules may be attached to one another and to the rail system. At least one game machine, one or more servers or both in some combination comprise a controller having a processor and memory storing instructions, which, when executed, cause the processor to, individually or collectively, control the modular multi-panel display to display game and non-game content.

BRIEF DESCRIPTION OF THE DRAWINGS

Features and advantages of certain embodiments of the present disclosure will become apparent from the following description of embodiments thereof, by way of example only, with reference to the accompanying drawings, in which.

Figure 1:
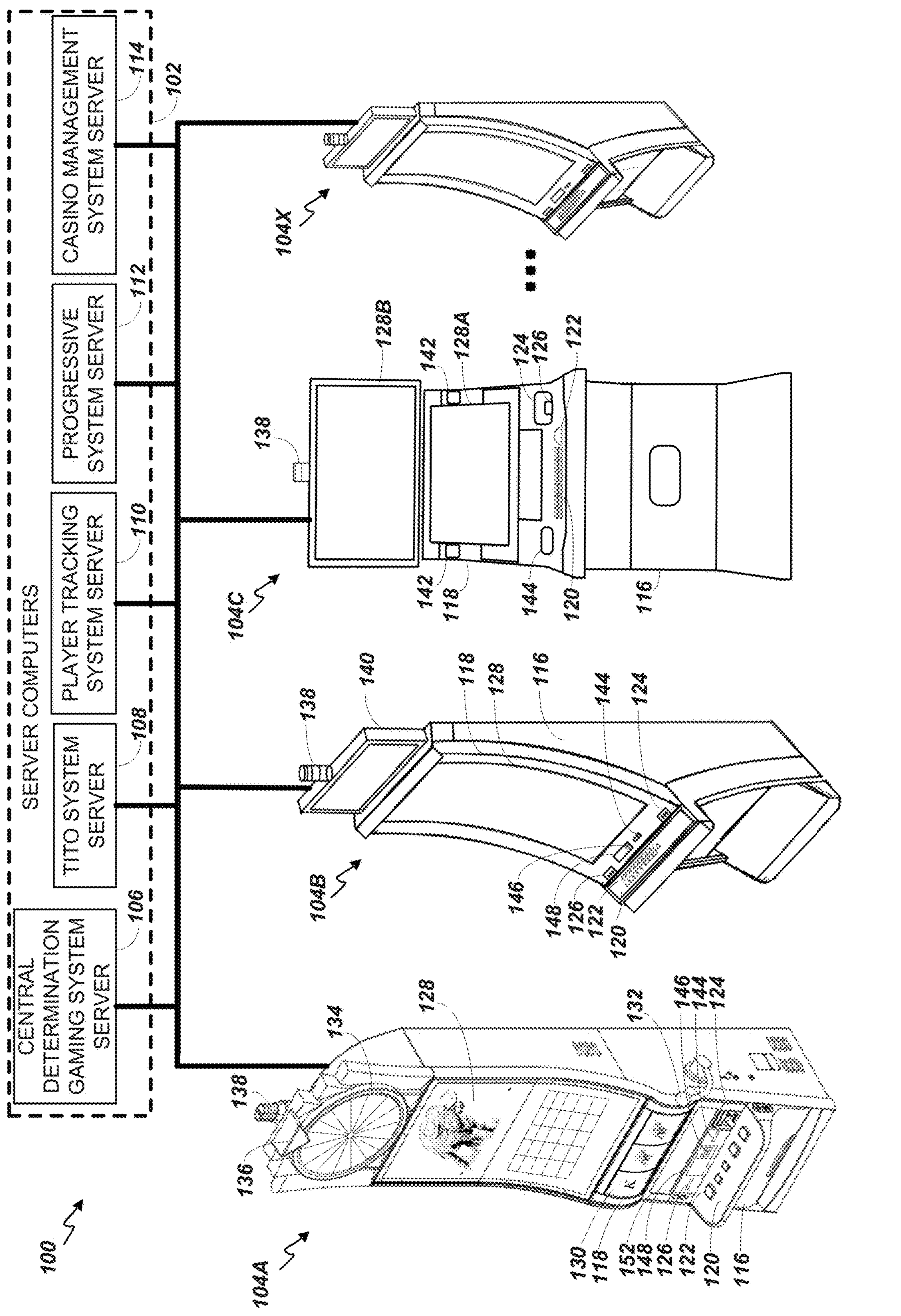
FIG. 1 is an exemplary diagram showing several EGMs networked with various gaming related servers.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present disclosure is not limited to the arrangements and instrumentality shown in the attached drawings.

DETAILED DESCRIPTION

Embodiments of a gaming system comprise a game machine having game machine display, and a multi-module overhead display assembly. The multi-module overhead display assembly comprises a housing module. The housing module may be connected to another housing module, wherein the housing module may be a base housing module, a junction housing module or an end housing module, that together form varied sized multi-panel display structures for overhead signage. In some embodiments, the base housing module, the junction housing module and end housing module comprise a matrix of display boards or panels, e.g., a modular light-emitting diode (LED) or organic LED (OLED) displays. During operation, the multi-module displays may be detachably supported on a mount system at a location where game or non-game specific contents can be displayed above the game machine or bank of gaming machines.

In some embodiments, the multi-module overhead display assembly comprises a plurality of housing modules having respective configurable toppers. Each housing module may be connected to another housing module, wherein the housing module may be a base housing module or an end housing module. In some embodiments, the base housing module and end housing module comprise a matrix of display boards or panels, e.g., a modular LED or OLED displays. During operation, the multi-module displays may be detachably supported on a mount system at a location where game or non-game specific content can be displayed above the game machine or bank of gaming machines.

One aspect of multi-module overhead display assembly is modularity. The modularity of the multi-panel display allows housing modules to be sized to fit across any number of gaming systems, gaming machines, slot machines, and, and may take many different configurations, e.g., a back to back configuration. By developing a defined number of interchangeable, modular, and detachably removable housing modules, a wide range of overhead display or signage configurations may be formed. The modular multi-panel display also provide modularity between gaming cabinets having different widths. For example, the housing modules may be combined to meet the dimensional requirements of both a MARS-X cabinet, which has a width of 27", or an ARC cabinet, which has a width of 30.5".

Another aspect of a multi-module overhead display assembly is scalability of the display assembly. The scalability allows for expansion or reduction of the multi-module overhead display assembly, typically, on-site and will cost little time consumption. For example, it may be possible to add to, or remove housing modules from, an existing multi-module overhead display assembly without complete disassembly of the existing multi-module overhead display assembly. Such adding or removal of housing modules would, in turn, allow the operator to increase an overall height of the multi-module overhead display assembly, or reduce the overall height of the multi-module overhead display assembly, for example.

Still another aspect of multi-module overhead display assembly is the mount system that allows additional panels to be added or removed without disrupting the existing signage. For example, when a casino floor designer or operator may wish add a bank of gaming machines to an existing bank of gaming machines, housing modules and mounts may be added to the existing multi-module overhead display assembly without tearing down and rebuilding the entire existing multi-module overhead display assembly. With the modularity of the entire existing multi-module overhead display assembly, merchandising a bank of games with an additional overhead display may be simplified without having to remove, repackage, ship, and rebuild the entire existing multi-module overhead display assembly.

Employing various housing modules that may be joined enhances modularity and scalability, reduces parts, and reduces inventory costs and risks. Another enhancement is that may increase product relevance and add to product longevity on the casino floor. The modularity of the system allows for better integration across all EGMs. Such modularity allows for a variety (e.g., different shapes) of signage toppers to be designed, and formed for attaching as the signage. Using FIG. 4D as an example, configurable base topper 444 may be a reconfigurable topper or a removable topper, and may be removed from the display panel 424, and a new or different configurable base topper can be attached to the display panels 424. By way of further example, one could create an S-curve type of signage.

As such, an operator can save or reduce cost by not procuring an entirely new sign assembly, shipping both new and old sign assemblies in or out, and by reducing (re) installation time. In some cases, most of these sign assemblies are built for a fixed projected footprint for a particular design. This, in turn, forces manufacturers to potentially over forecast customer needs and build several lines of these signs to fit various configurations. This creates added costs and risk for the manufacturers because they have to accurately predict that the projected footprints will match what the operators ultimately want. In contrast, a modular signage allows manufacturers to quickly modify the signage to include different sizes or shapes, for example, and in turn, avoids at least forecasting and cost issues currently presented.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
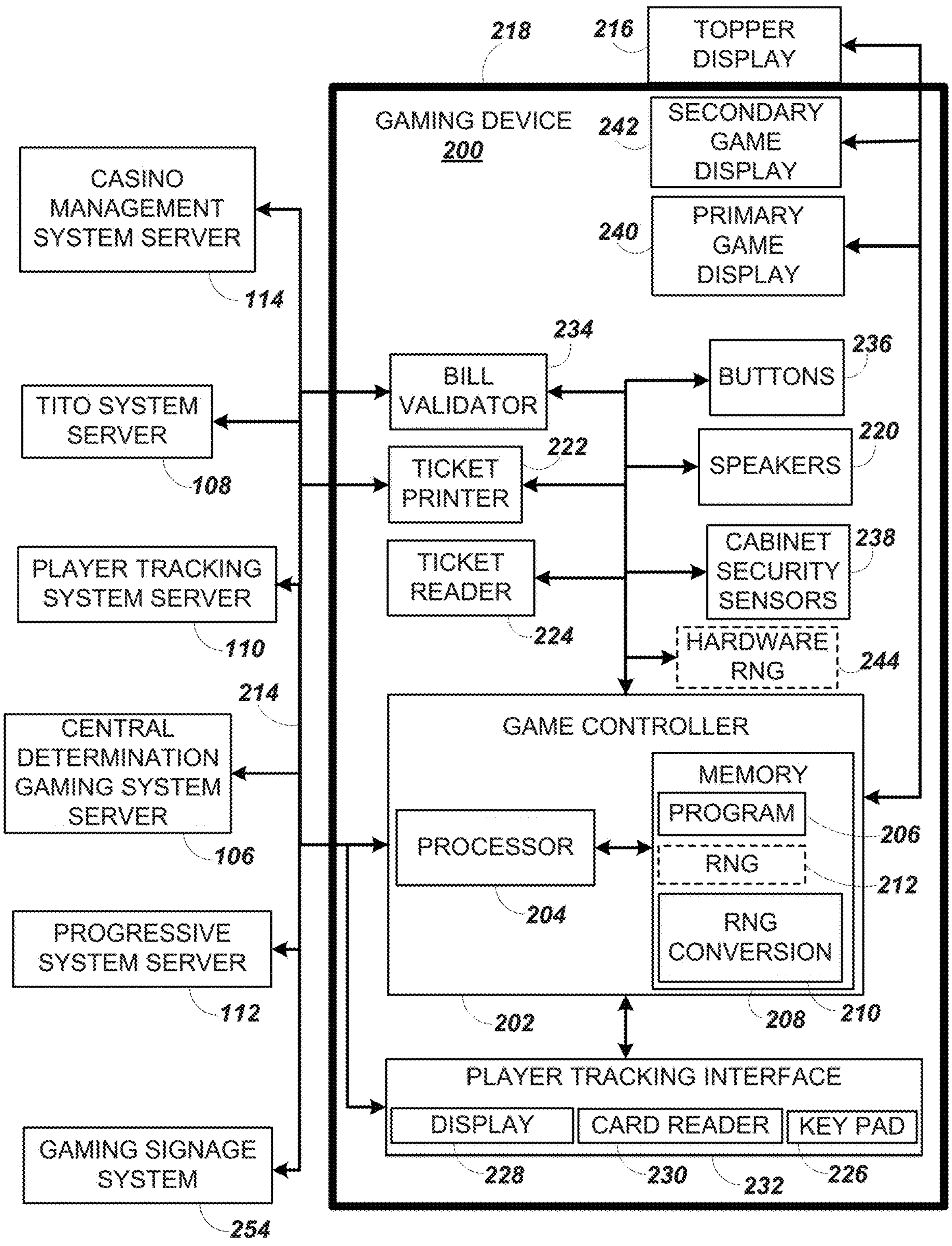
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat®

Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
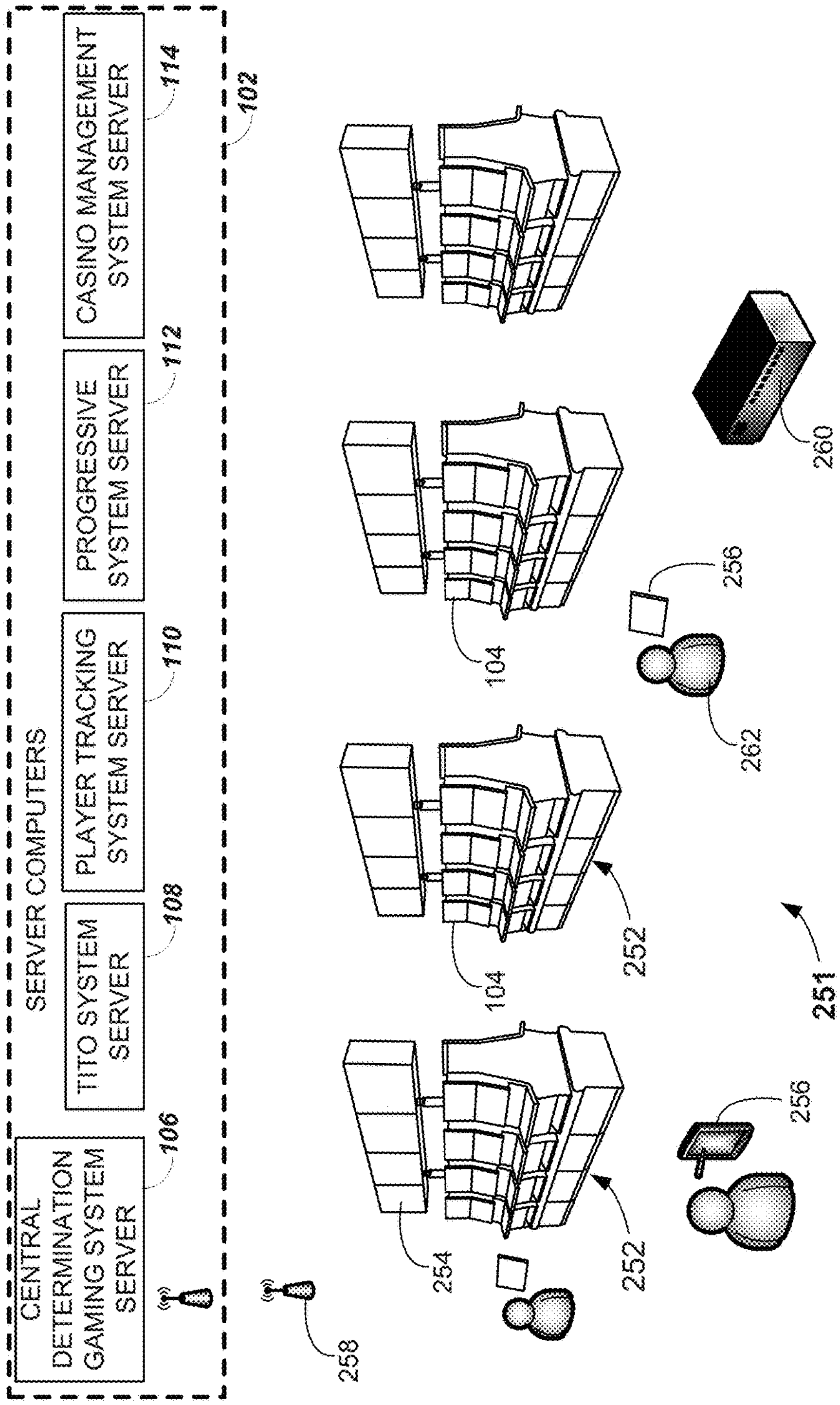
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming display system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 3:
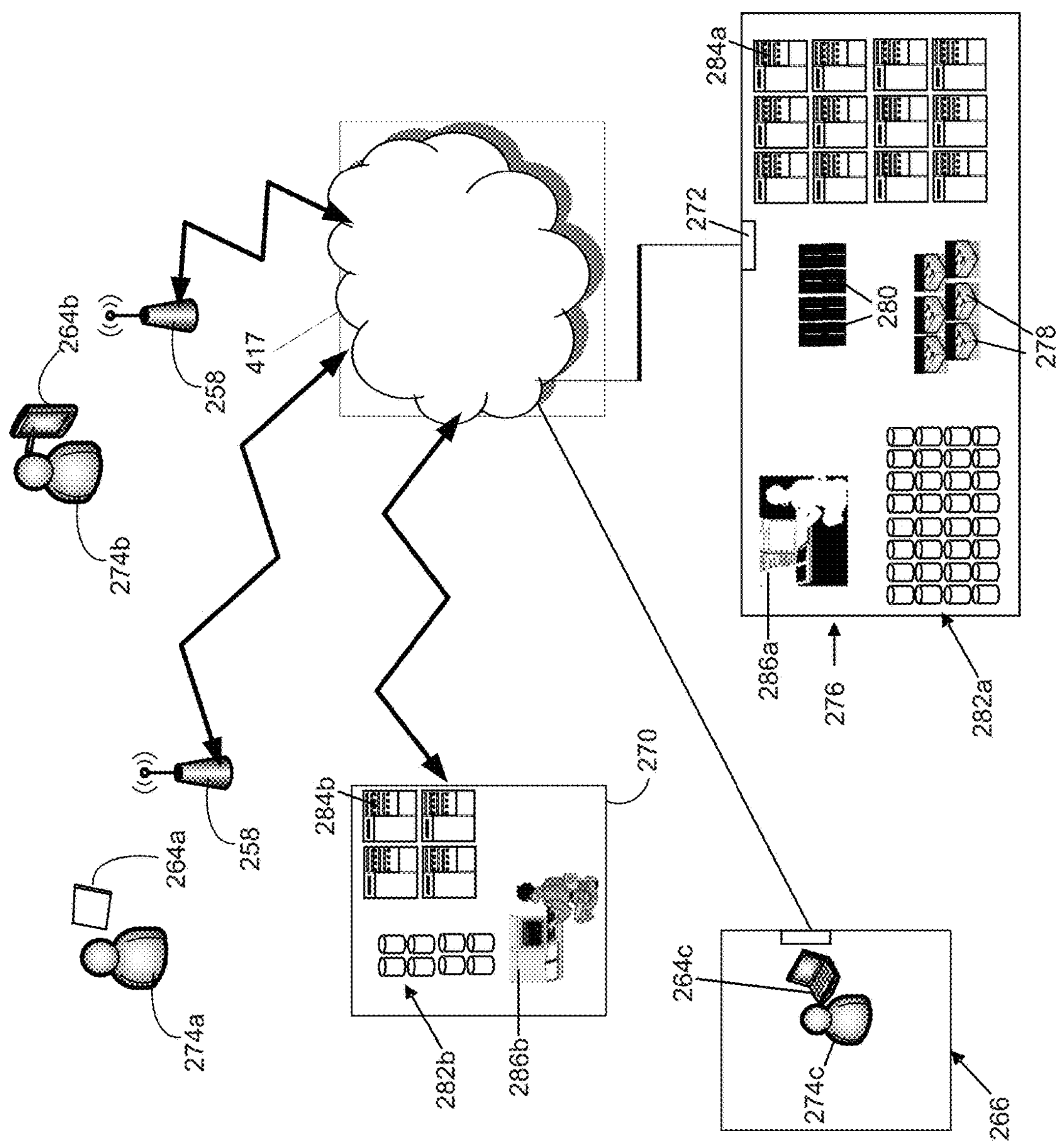
FIG. 3 is a diagram that shows examples of components of a system for providing online gaming according to some aspects of the present disclosure.

FIG. 3 is a diagram that shows examples of components of a system for providing online gaming according to some aspects of the present disclosure. As with other figures presented in this disclosure, the numbers, types and arrangements of gaming devices shown in FIG. 3 are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 3. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 3, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication.

Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 4A:
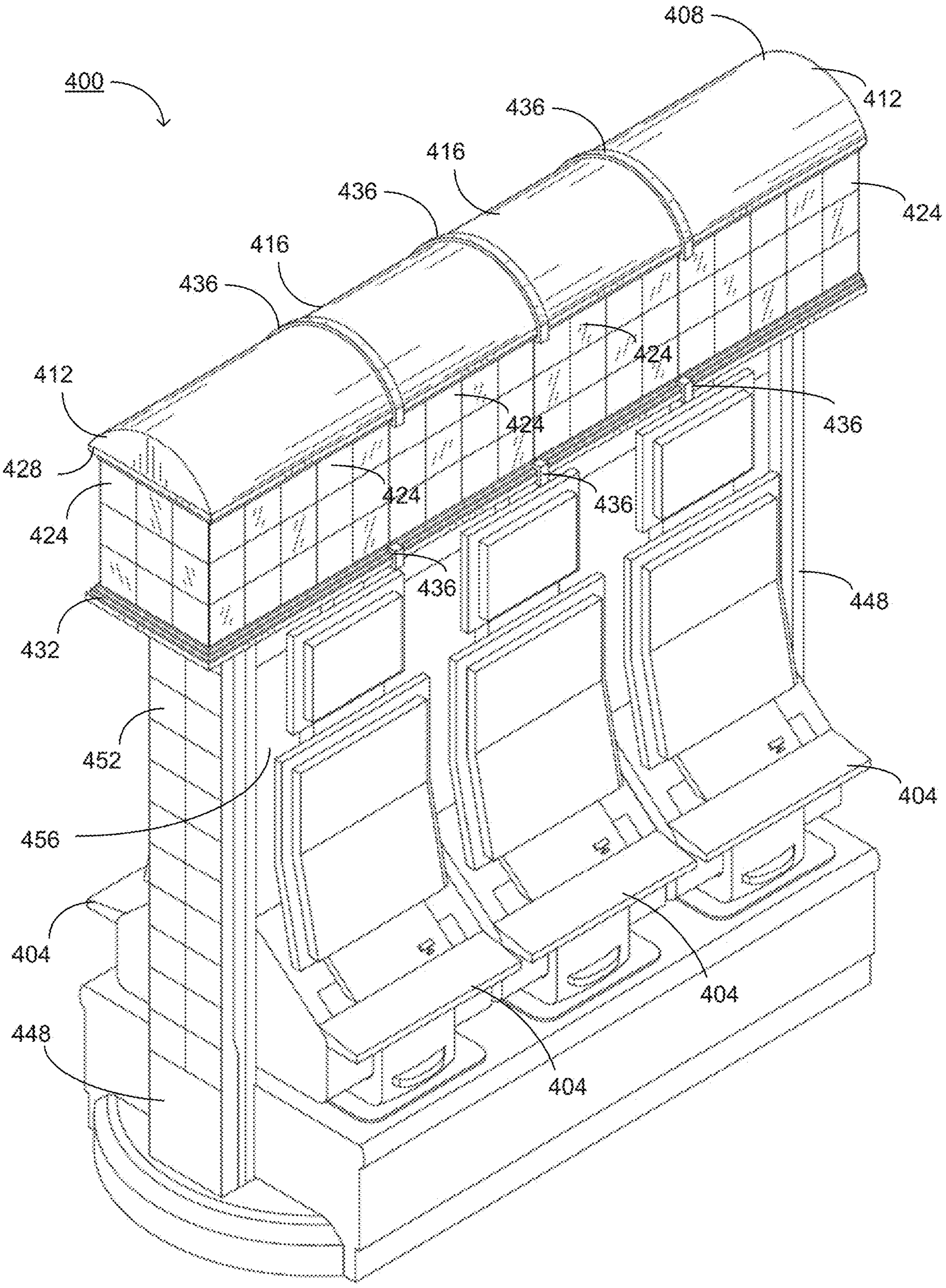
FIGS. 4A, 4B, 4C, 4D, 4E, 4F, and 4G illustrate an embodiment of a first back-to-back gaming machine bank.
Figure 4B:
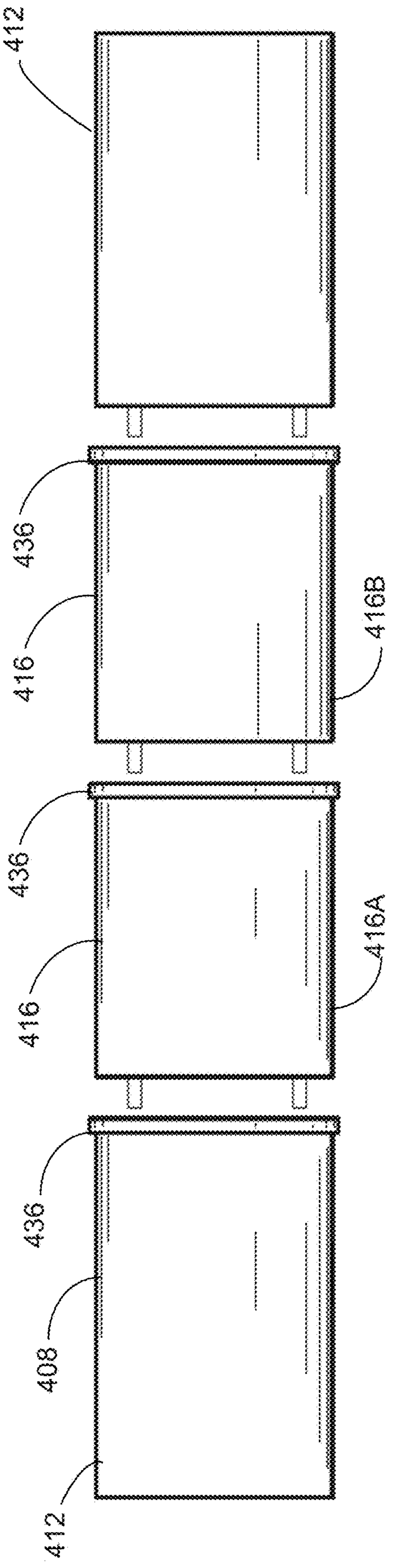
Figure 4C:
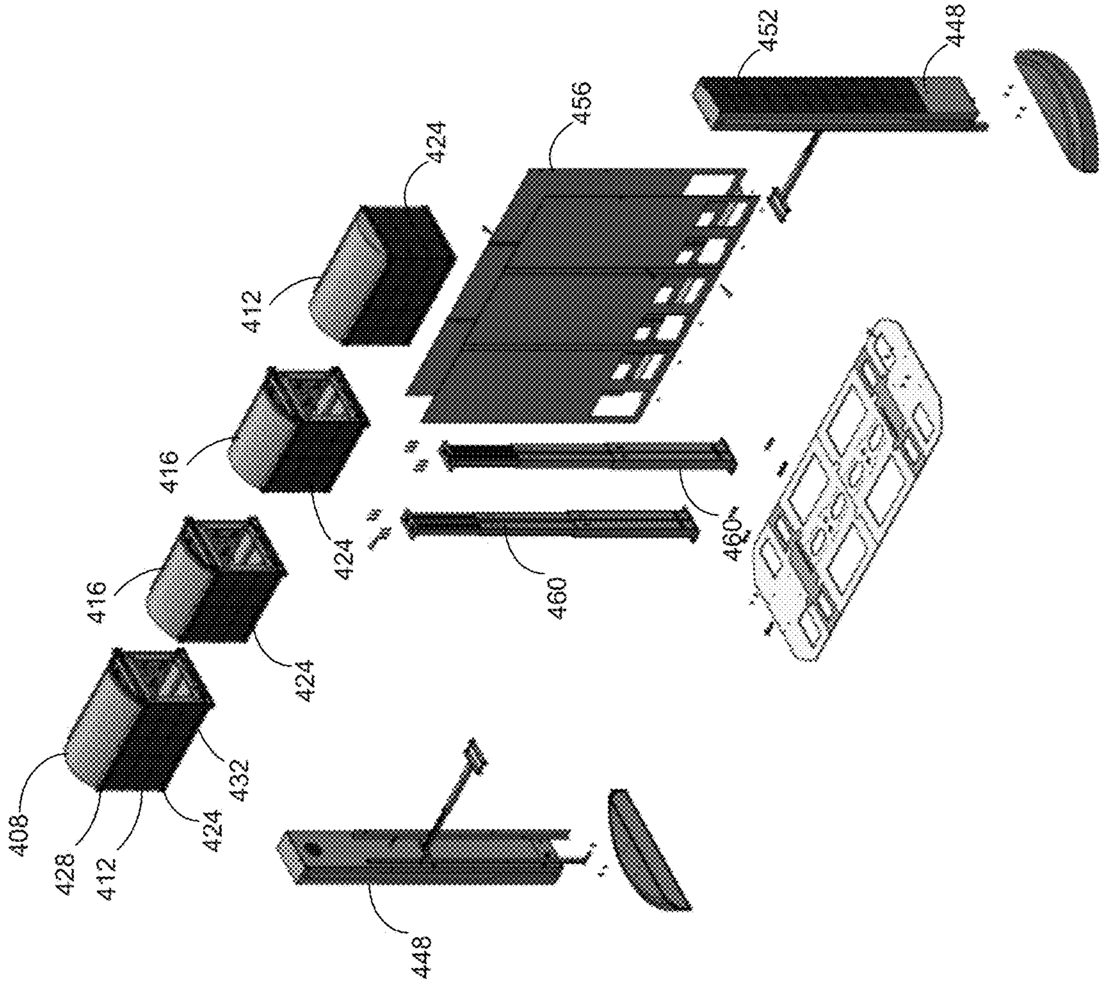

FIG. 4A illustrates an embodiment of a first back-to-back gaming machine bank 400. The first back-to-back gaming machine bank 400 is 3×3 back-to-back gaming machine bank, thus including six (6) electronic gaming machines 404. The first back-to-back gaming machine bank 400 also includes a first modular overhead display 408, similar to the gaming display system 254 of FIG. 2B. As shown in FIGS. 4B and 4C, the first modular overhead display 408 includes four (4) modules—two of an end display module 412 and two of a base display module 416. As discussed in detail below, the end display module 412 may include a first plurality of display panels, while the base display module 416 may include a different second plurality of display panels. In addition, the end display module 412 may include display panels 424 arranged on three external carriage or mount panels, whereas the base display module 416 may include display panels 424 arranged on two external carriage or mount panels on either sides of the base display module 416. The display panels 424 may be individually removed if one becomes damaged or needs repair without disturbing the other display panels.

Each of the end display modules 412 and base display modules 416 may also include a first lighting device 428 above the display panels 424, and a second lighting device 432 below the display panels 424. As shown, the first lighting device 428 is a continuous lighting rope secured around some portions of the perimeter of each of the end display module 412 and the base display module 416. For example, the first lighting device 428 may be secured to three sides of the end display module 412, whereas the first lighting device 428 may be secured to only two sides of the base display module 416. Similarly, the second lighting device 432 may be secured to each of the end display modules 412 and the base display modules 416, below the display panels 424. The first lighting device 428 of the base display module 416 may be interfaced, connected, or attached to the first lighting device 428 of the end display module 412 or a different base display module similar to the base display module 416. This connection may be accomplished with a releasable electrical interface such as a daisy-chain interface (not shown). Although the first lighting device 428 and the second lighting device 432 are shown as continuous lighting ropes, other types of lighting devices, such as, for example, discrete LED strips, may also be used. In other embodiments, the first lighting device 428 of the base display module 416 may be electrically connected to the first lighting device 428 of the end display module 412 or a different base display module similar to the base display module 416 with one or more plug-and-play connectors (not shown).

The end display module 412 may be releasably connected to, secured to, clipped, connected with, or snapped to the base display module 416 via a bracket connector 436 such that display panels on the end display module 412 and the base display module 416 appear seamless from the base display module 416 to a different base display module, or to the end display module 412. Releasably connecting the overhead display modules allows the overhead display modules to increase or decrease and allows for the interchange and exchange of overhead display modules, which enhances service and repair capabilities when the housing modules can be disassembled in part. In some embodiments, in addition to mechanically connecting together the overhead display modules, the bracket connector 436 may include locking mechanisms, interlocking connectors, or other connectors that allows for mechanical connections and electrical communications between the overhead display modules.

In some embodiments, the bracket connector 436 could be designed to form a seamless overhead signage with components that may have dimensional discrepancies. The bracket connector 436 could be also designed to hide, conceal or obscure components that do not line up to form a seamless signage display. For example, this misalignment could occur with connecting a light rope from different modules. Oftentimes, the light ropes cannot be perfectly lined up once the different modules are separated and reattached together. The bracket connectors 436 could hide this flaw. Further, in some embodiments, the light ropes are continuous for each individual module. That is, each module may include its own light rope. When a module is connected to another module, the individual light ropes are also connected and may appear continuous. Thus, while the light rope may appear to be continuous for the modular overhead display, the light ropes in actuality are removably connected based on the different individual modules.

Figure 4D:
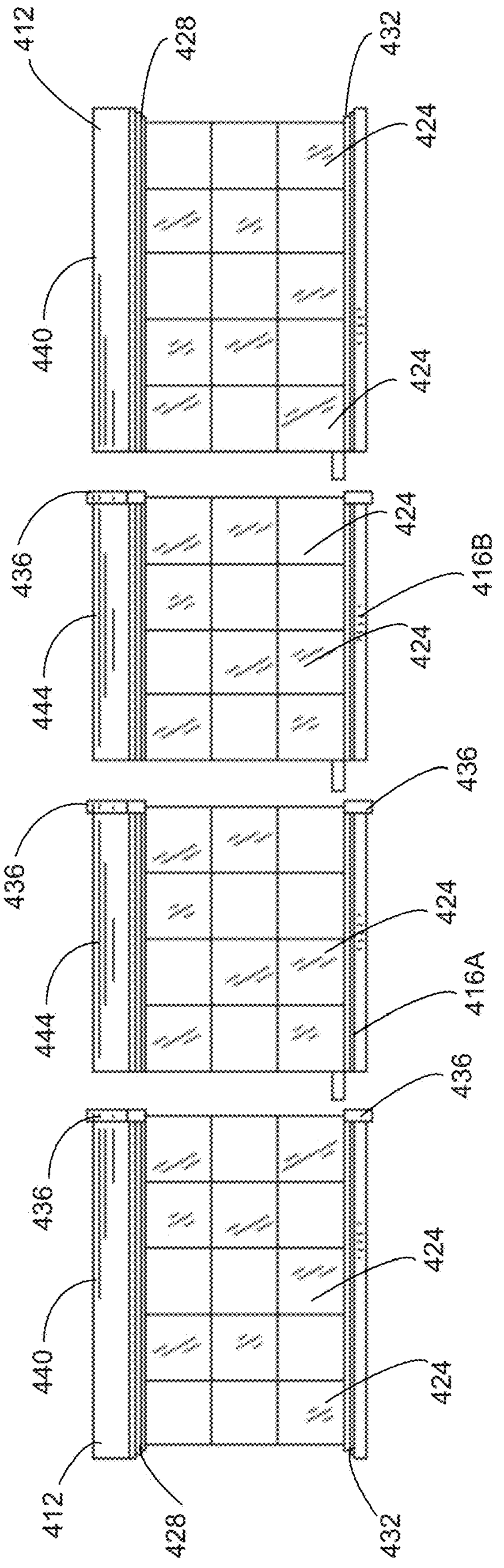

For appearance, structural, and/or security purposes, as shown in FIG. 4D, the end display module 412 may also include a configurable end topper 440, whereas the base display module 416 may also include a configurable base topper 444. In the embodiment shown, the configurable end topper 440 and the configurable base topper 444 appear to have a curved shape, the configurable end topper 440 and the configurable base topper 444 may acquire other shapes and/or forms, such as, for example, dome, flat top, train tracks, and other configurable toppers to showcase specific types of games being presented. Even though the end display module 412 and the base display module 416 may be constructed incorporating relatively lightweight material where possible, the first modular overhead display 408 are supported with one or more end banks 448 having respective bases 450. Each of the one or more end banks 448 may include a plurality of end bank display panels 452 similar to the display panels 424. Although the end bank display panels 452 are shown on one side of the one or more end banks 448, the one or more end banks 448 may have end bank display panels 452 that wrap around the one or more end banks 448.

As discussed above, the first back-to-back gaming machine bank 400 is 3×3 back-to-back gaming machine bank, including a front bank of three gaming machines, and a back bank of three gaming machines. The front bank of three gaming machines are separated from the back bank of three gaming machines with one or more modular back plates or modular machine fillers 456.

FIG. 4C illustrates an exploded view of the first modular overhead display 408 and its support structure of FIG. 4A, wherein like numerals refer to like parts. As shown, six modular machine fillers 456 separate the front bank of three gaming machines of FIG. 4A from the back bank of three gaming machines. FIG. 4C also shows that, in addition to the end banks 448, a plurality of internal supporting poles 460 also support the first modular overhead display 408. FIG. 4D illustrates an embodiment of a plurality of overhead display modules for use with the first back-to-back gaming machine bank 400 of FIG. 4A. As shown, the end display module 412 includes fifteen (15) display panels 424 arranged in a 3×5 matrix, while the base display module 416 includes twelve (12) display panels 424 arranged in a 3×4 matrix. Further, one of the base display module 416 is a master display module 416A that controls the other of the base display module 416, which is a slave display module 416B. In some embodiments, the master display module 416A may also function as an communication or information hub that distributes control information and/or display data to other modules of the first modular overhead display 408 such as the end display module 412 and the base display module 416. In other embodiments, the end display module 412 may be designated or configured as a master module.

Figure 4E:
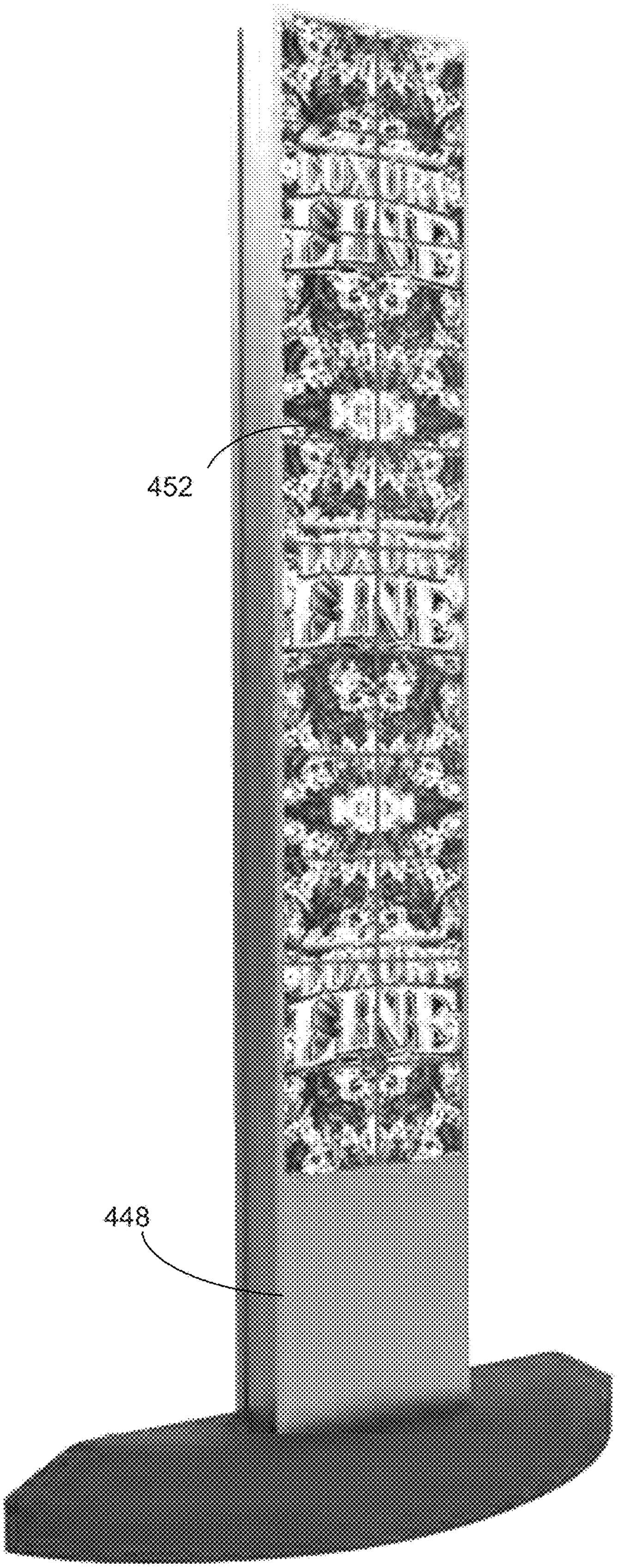
Figure 4F:
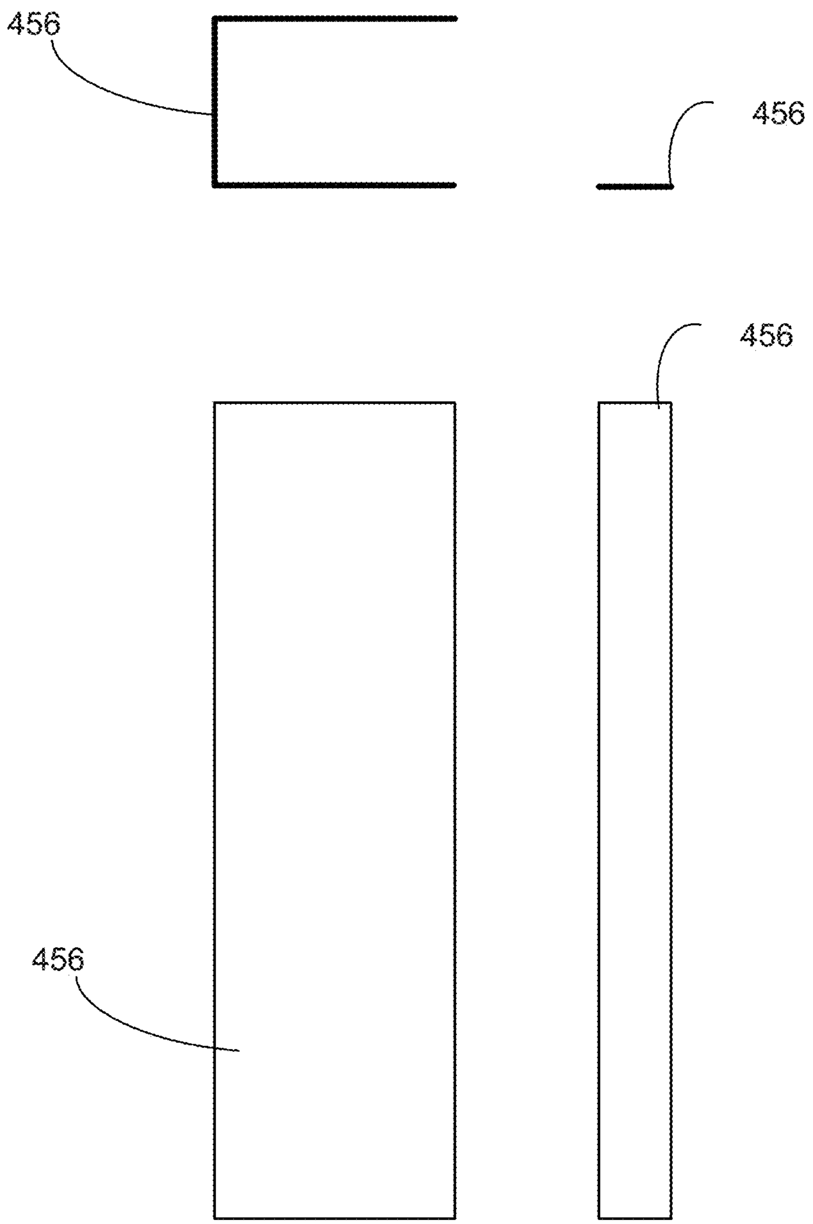
Figure 4G:
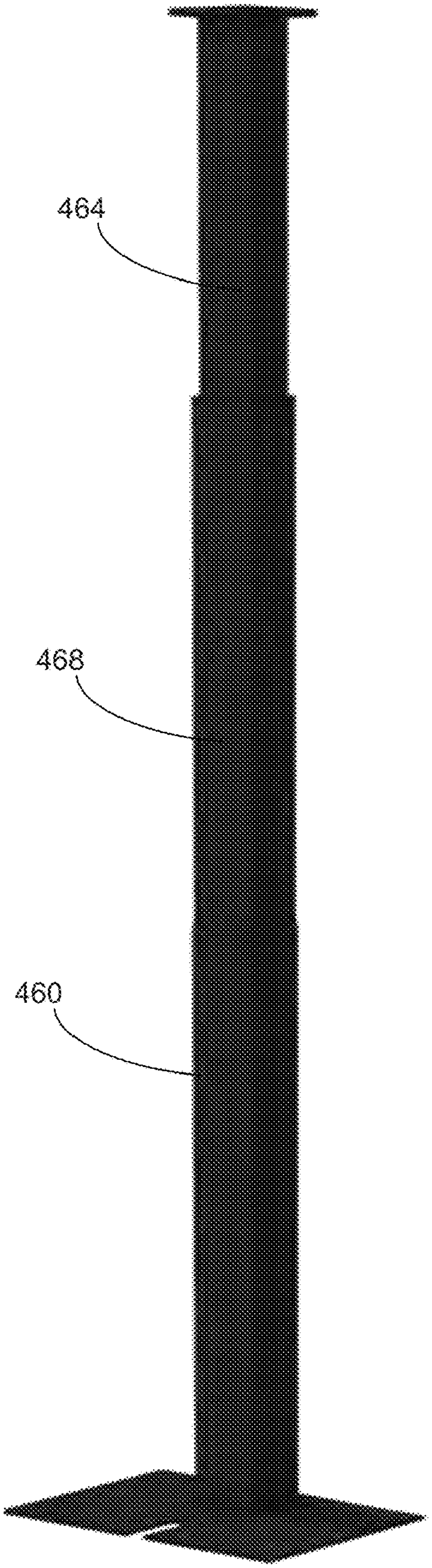

FIG. 4E illustrates an embodiment of the end bank 448 for use with the first back-to-back gaming machine bank 400 of FIG. 4A. The end bank 448, as shown, includes twenty-two (22) end bank display panels 452. As discussed above, in some embodiments, the end bank display panels 452 may have the same size as the display panels 424. However, in other embodiments, the end bank 448 may include a single display (not shown). In still other embodiments, the end bank 448 may include display panels to wrap around the end bank 448, in addition to the twenty-two (22) end bank display panels 452. FIGS. 4F and 4G illustrate exemplary details of the modular machine fillers 456 and the internal supporting pole 460, respectively. Specifically, as shown in FIG. 4G, the internal supporting pole 460 may be extended to increase its height via an extendable portion 464 with respect to a base support portion 468. Thus, the internal supporting pole 460 may be adjusted to support the first modular overhead display 408 in order to evenly level the end display module 412 and the base display module 416.

Figure 5A:
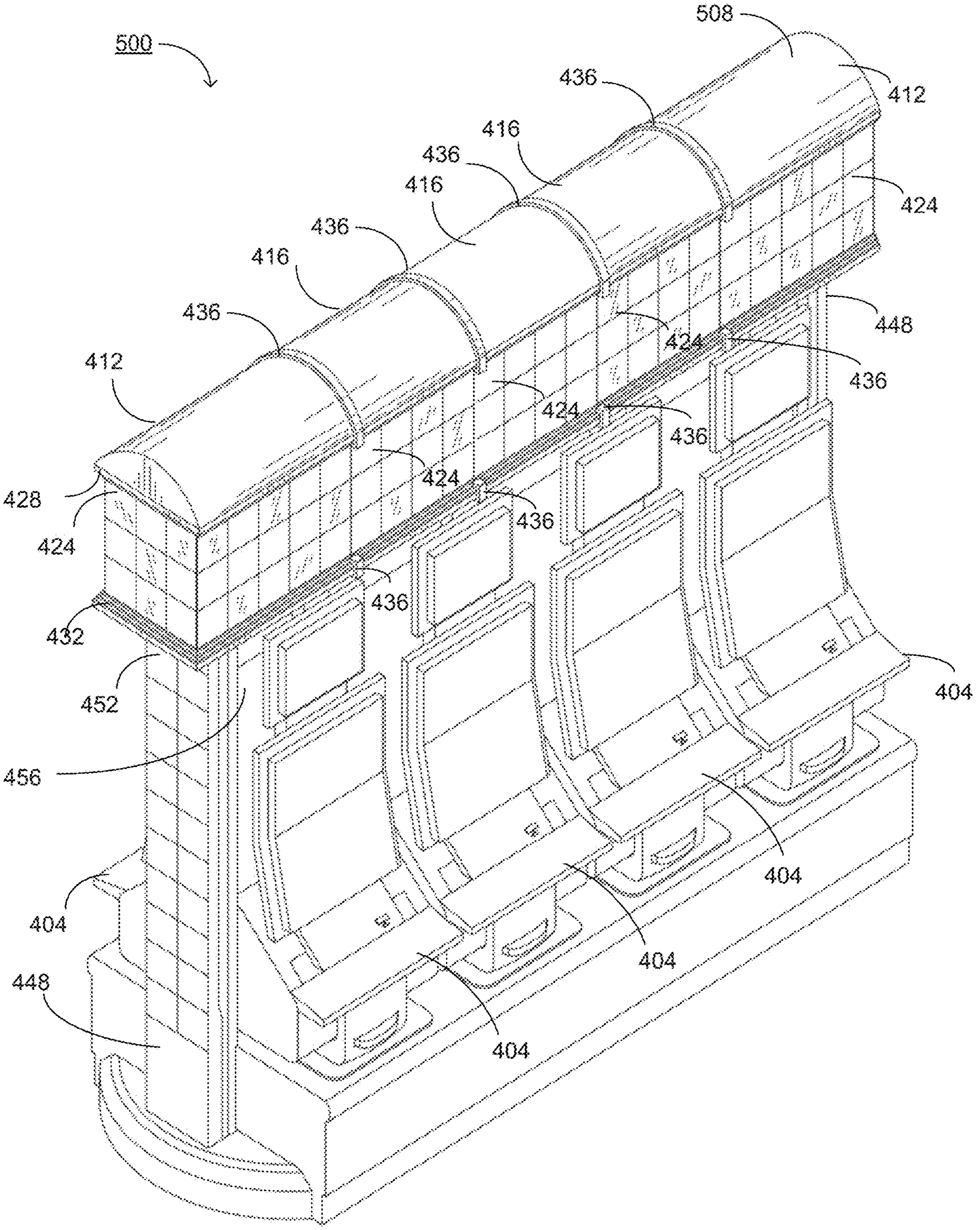
FIGS. 5A, 5B, and 5C illustrate an embodiment of a second back-to-back gaming machine bank.
Figure 5B:
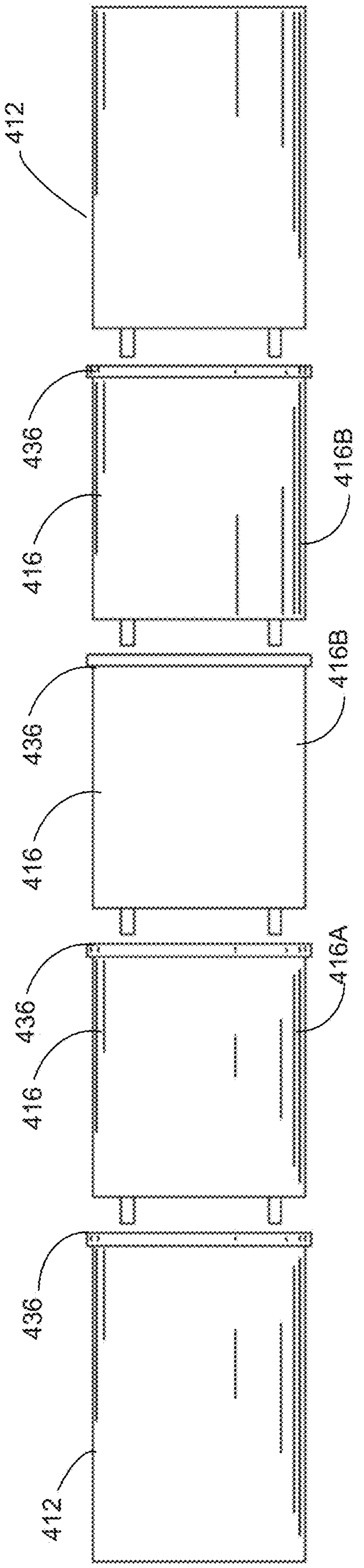
Figure 5C:
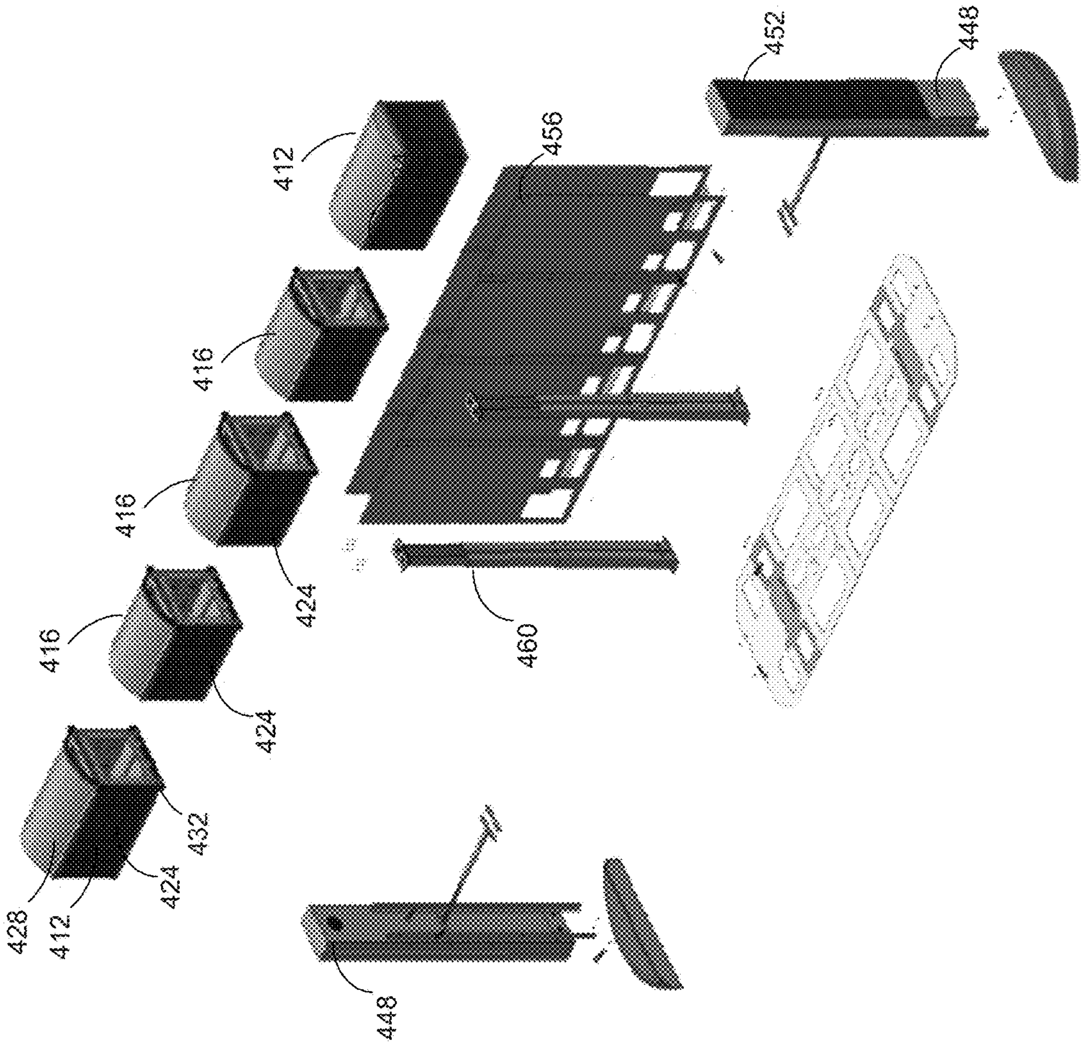

FIGS. 5A, 5B, and 5C illustrate an embodiment of a second back-to-back gaming machine bank 500, wherein like numerals refer to like parts. The second back-to-back gaming machine bank 500 is 4×4 back-to-back gaming machine bank, thus including eight (8) electronic gaming machines 404. The second back-to-back gaming machine bank 500 also includes a second modular overhead display 508, similar to the first back-to-back gaming machine bank 400 of FIG. 4A. The second modular overhead display 508 includes three of the base display modules 416 sandwiched between two end display modules 412 of FIG. 4A. As discussed above with respect to FIGS. 4A and 4B, both the end display module 412 and the base display module 416 may include display panels 424.

Similar to the first back-to-back gaming machine bank 400, the second back-to-back gaming machine bank 500 includes eight (8) modular back plates or modular machine fillers 456 to separate front bank of gaming machines from the back bank of gaming machines. The exploded view in FIG. 5C shows that the second modular overhead display 508 is also supported by two (2) internal supporting poles 460.

Figure 6A:
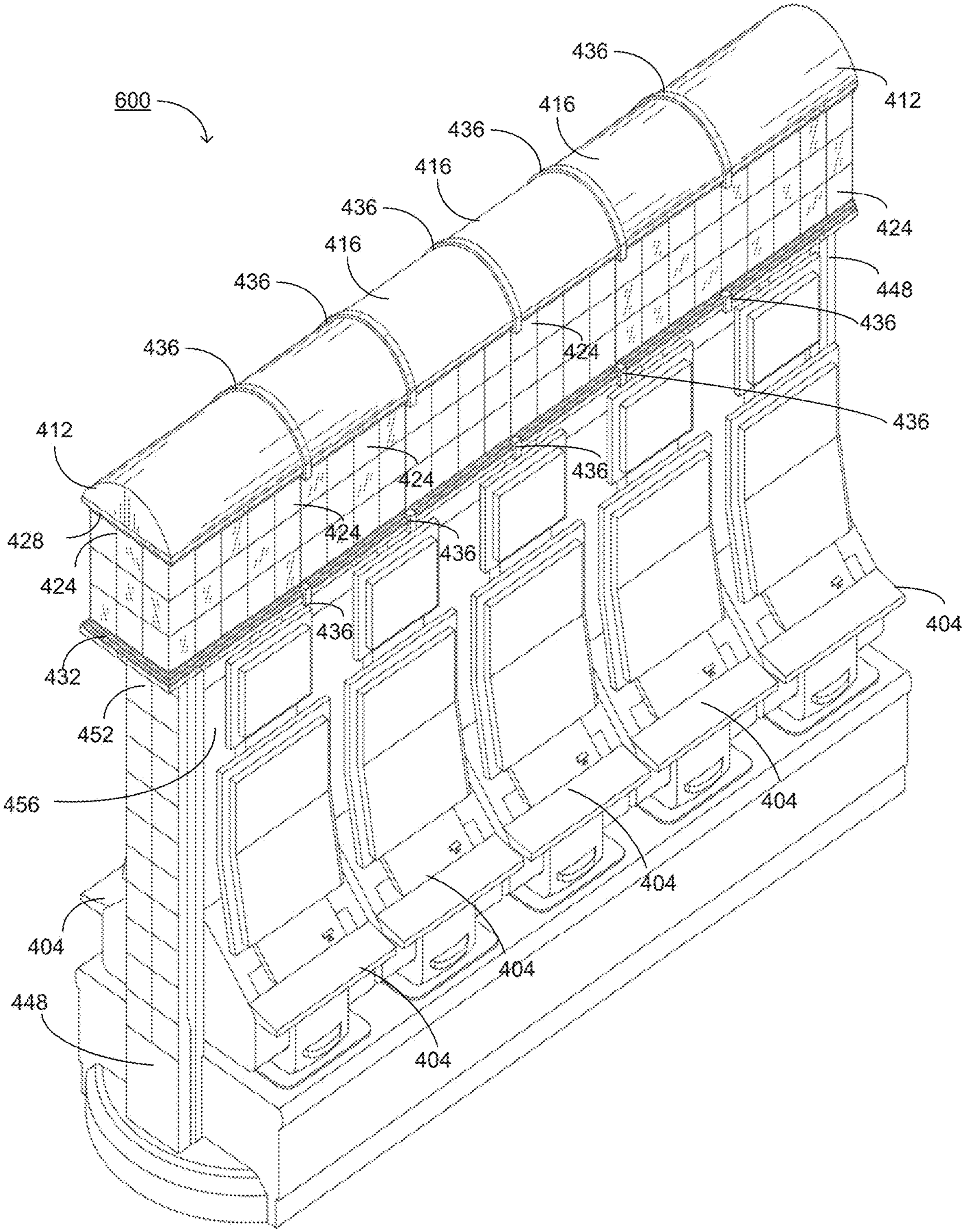
FIGS. 6A and 6B illustrate an embodiment of a third back-to-back gaming machine bank.
Figure 6B:
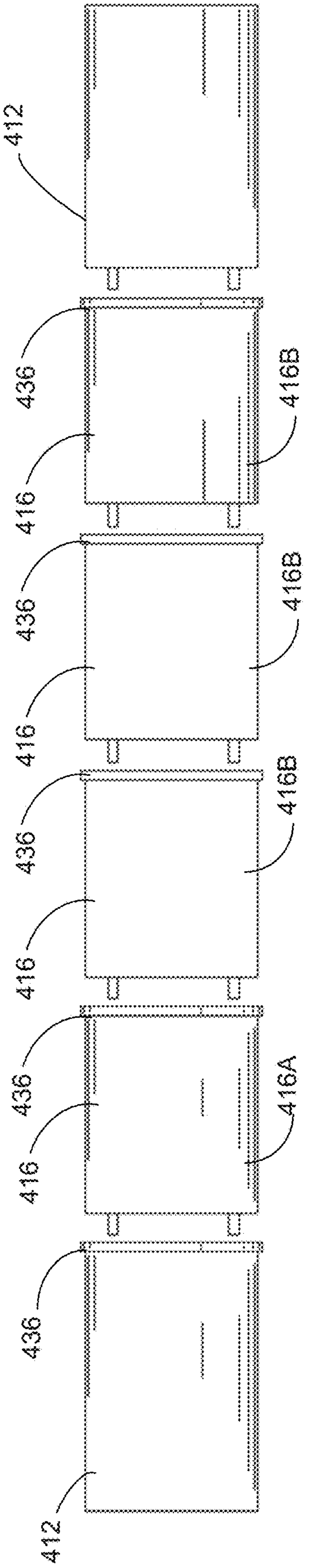

Similarly, FIGS. 6A and 6B illustrate an embodiment of a third back-to-back gaming machine bank 600, wherein like numerals refer to like parts. The third back-to-back gaming machine bank 600 is 5×5 back-to-back gaming machine bank, thus including ten (10) electronic gaming machines 404. The third back-to-back gaming machine bank 600 also includes a third modular overhead display 608, similar to the first back-to-back gaming machine bank 400 of FIG. 4A. The third modular overhead display 608 includes five of the base display modules 416 sandwiched between two end display modules 412 of FIG. 4A. As discussed above with respect to FIGS. 4A and 4B, both the end display module 412 and the base display module 416 may include display panels 424.

In some embodiments, one or more gaming machines may be added to the first back-to-back gaming machine bank 400 to form an extended gaming machine bank, while similarly extending the first modular overhead display 408 to form an extended overhead display similar to the second modular overhead display 508 or the third modular overhead display 608, without removing the first modular overhead display 408 entirely. Conversely, one or more gaming machines may be removed from the third back-to-back gaming machine bank 600 to form a shorter gaming machine similar to the second back-to-back gaming machine bank 500, while similarly shortening the third modular overhead display 608 to form a shortened overhead display similar to the first modular overhead display 408 or the second modular overhead display 508, also without removing the third modular overhead display 608 entirely. Furthermore, one or more modules of an overhead display similar to first modular overhead display 408, the second modular overhead display 508, or the third modular overhead display 608 may be replaced without removing the entire overhead display.

In one example, two additional back-to-back gaming machines may be added to the first back-to-back gaming machine bank 400 to form the second back-to-back gaming machine bank 500, that is, converting the 3×3 back-to-back gaming machine bank to the 4×4 back-to-back gaming machine bank. In parallel, the first modular overhead display 408 may be converted to form the second modular overhead display 508. Specifically, one of the end display modules 412 of the first modular overhead display 408 may be removed without removing the remaining base display module 416 and the other end display module, thereby resulting in the first modular overhead display 408 being in a disassembled state, or the second modular overhead display 508 being in an initial assembled state. In the initial assembled state, an additional base display module similar to the base display module 416 may be releasably connected to the remaining base display module 416 via the bracket connector 436 to form an extended overhead display, thus extending its length to cover more gaming machines. Thereafter, the end display module 412 that has been removed, or a different end display module similar to the end display module 412 may be releasably reconnected to the extended overhead display to form the second modular overhead display 508.

Conversely, as discussed above, one or more modules of an overhead display may be removed to match a shortened gaming machine bank. For example, two back-to-back gaming machines may be removed from the third back-to-back gaming machine bank 600 to form the second back-to-back gaming machine bank 500, that is, converting the 5×5 back-to-back gaming machine bank to the 4×4 back-to-back gaming machine bank. In parallel, the third modular overhead display 608 may be converted to form the second modular overhead display 508. In such a case, one of the end display modules 412 of the third modular overhead display 608 may be removed without removing the remaining base display module 416 and the other end display module, thereby resulting in the third modular overhead display 608 being in a disassembled state. In the disassembled state, one of the base display modules 416 may be releasably removed from the remaining base display module 416 to form a shortened overhead display. Thereafter, the end display module 412 that has been removed may be releasably reconnected to the shortened overhead display to form the second modular overhead display 508.

Figure 7A:
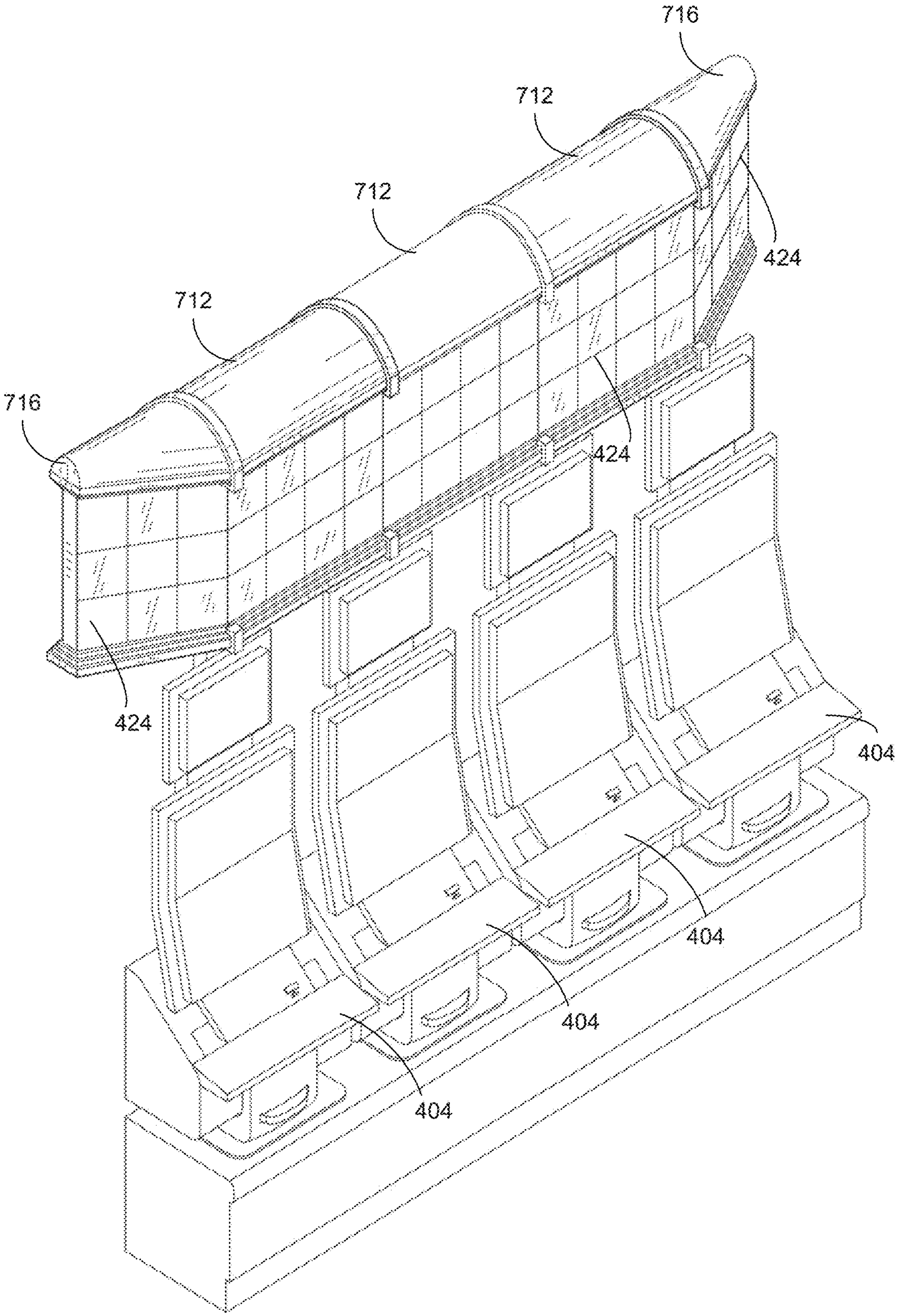
FIGS. 7A, 7B, and 7C illustrate an embodiment of a first wall gaming machine bank.

FIG. 7A illustrate an embodiment of a first wall gaming machine bank 700, wherein like numerals refer to like parts. Unlike the third back-to-back gaming machine bank 600 of FIG. 6A, the first wall gaming machine bank 700 includes four (4) electronic gaming machines 404 (of FIG. 4A) arranged along a wall (not shown). The first wall gaming machine bank 700 also includes a first wall modular overhead display 708 that further includes three basic wall display module 712 sandwiched between two end wall display modules 716. Each of the basic wall display module 712 and the end wall display module 716 include a plurality of display panels 424.

Figure 7B:
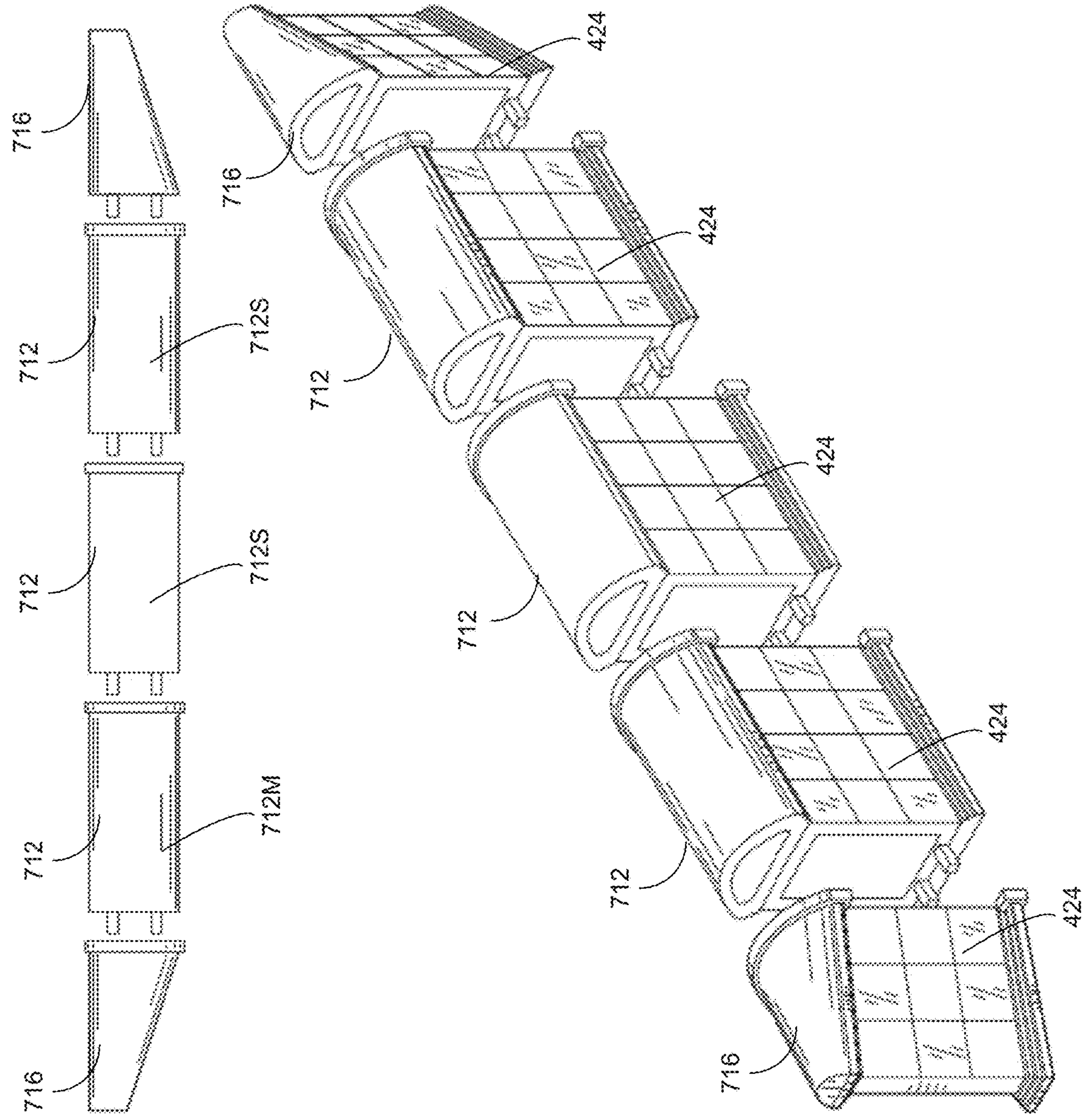

FIG. 7B illustrates a top view and a perspective view of the first wall modular overhead display 708 for use with the first wall gaming machine bank 700 of FIG. 7A. Unlike the third modular overhead display 608 where the bracket connector 436 connects the base display modules 416 with the end display modules 412, the basic wall display module 712 is connected to the end wall display module 716 with an internal bracket connector (not shown). Further, one of the basic wall display module 712 is a master display module 712M that controls the other of the basic wall display module 712, which is a slave display module 712S. In some embodiments, the master display module 712M may also function as an communication or information hub that distributes control information and/or display data to other modules of the first wall gaming machine bank 700 such as the end wall display module 716 and the basic wall display module 712. In other embodiments, the end wall display module 716 may be designated or configured as a master module.

Figure 7C:
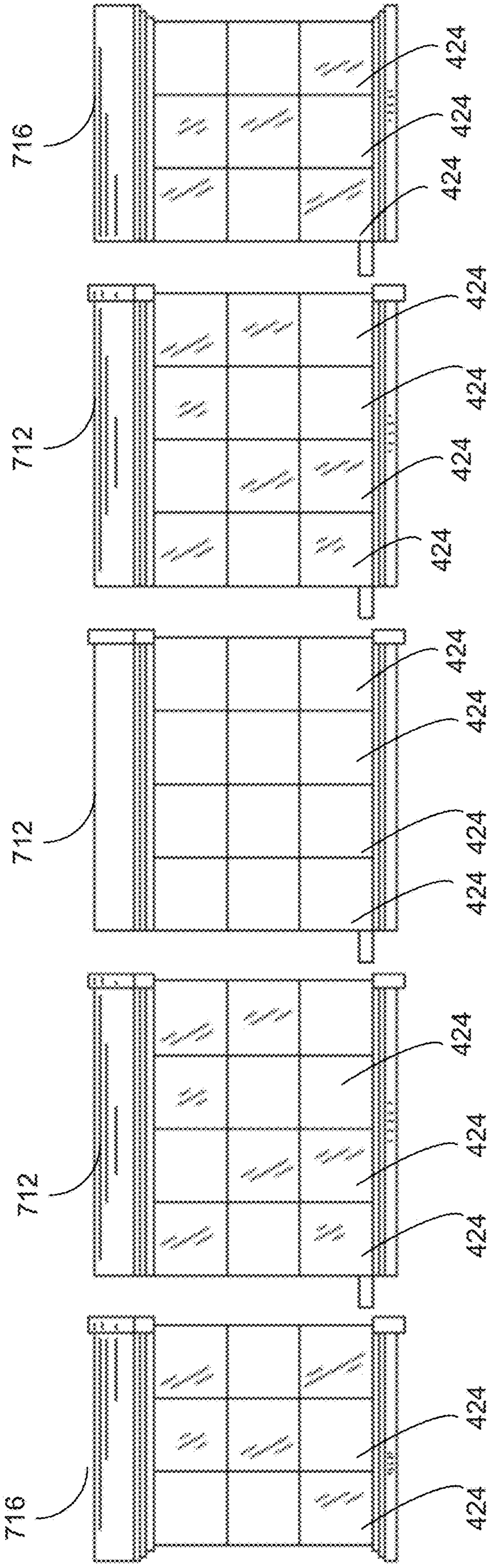

FIG. 7C illustrates a front view of the first wall modular overhead display 708 for use with the first wall gaming machine bank 700 of FIG. 7A. As shown, the basic wall display module 712 includes twelve (12) display panels 424 arranged in a 3×4 matrix, while the end wall display module 716 includes nine (9) display panels 424 arranged in a 3×3 matrix. When connected, the basic wall display module 712 and the end wall display module 716 provide seamless display panels from display to display, from module to module.

Figure 8A:
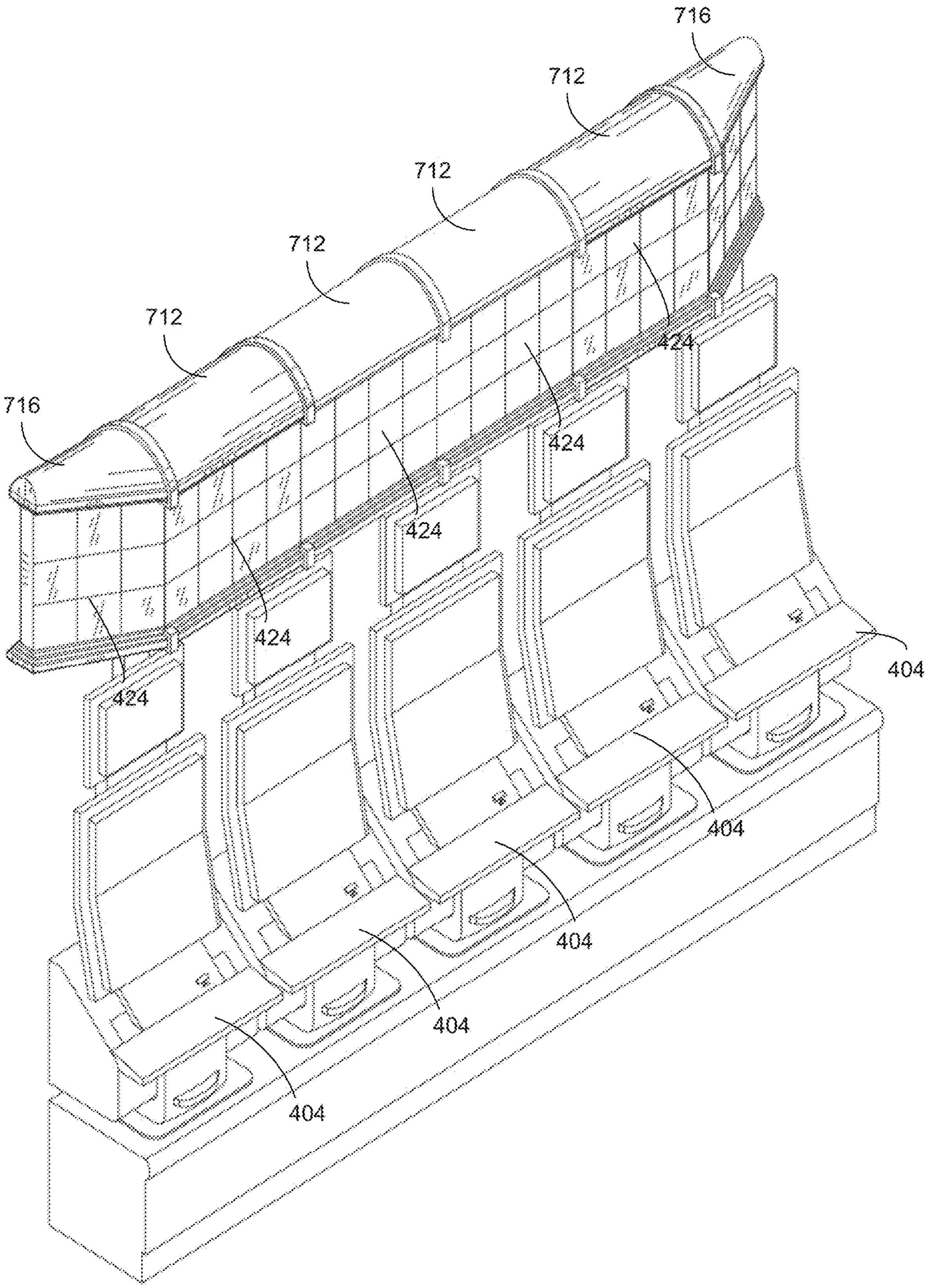
FIGS. 8A and 8B illustrate an embodiment of a second wall gaming machine bank.

FIG. 8A illustrates an embodiment of a second wall gaming machine bank 800, wherein like numerals refer to like parts. The second wall gaming machine bank 800 includes five (5) electronic gaming machines 404 (of FIG. 4A) arranged along a wall (not shown). The second wall gaming machine bank 800 also includes a second wall modular overhead display 808 that further includes four basic wall display module 712 sandwiched between two end wall display modules 716. As discussed above, each of the basic wall display module 712 and the end wall display module 716 include a plurality of display panels 424. As shown, a pair of wall mount supports 812 provides supports for the second wall modular overhead display 808. In some embodiments, the wall mount support 812 is similar to the internal supporting pole 460 of FIG. 4G. In other embodiments, the wall mount support 812 may include other support systems.

Figure 8B:
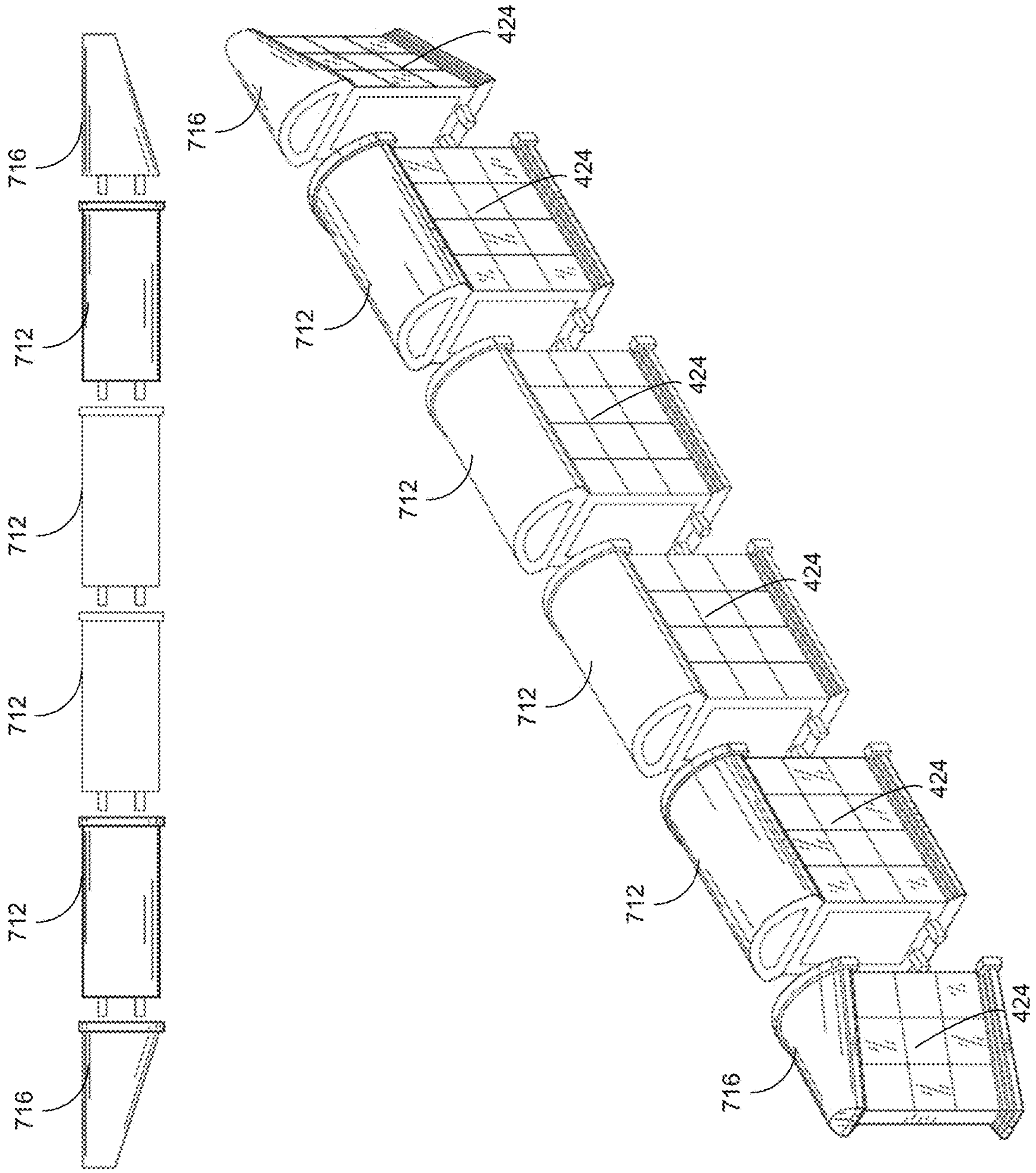

FIG. 8B illustrates a top view and a perspective view of the second wall modular overhead display 808 for use with the second wall gaming machine bank 800 of FIG. 8A. Like the first wall gaming machine bank 700 of FIG. 7A, the basic wall display module 712 is also connected to the end wall display module 716 with an internal bracket connector (not shown).

Figure 9A:
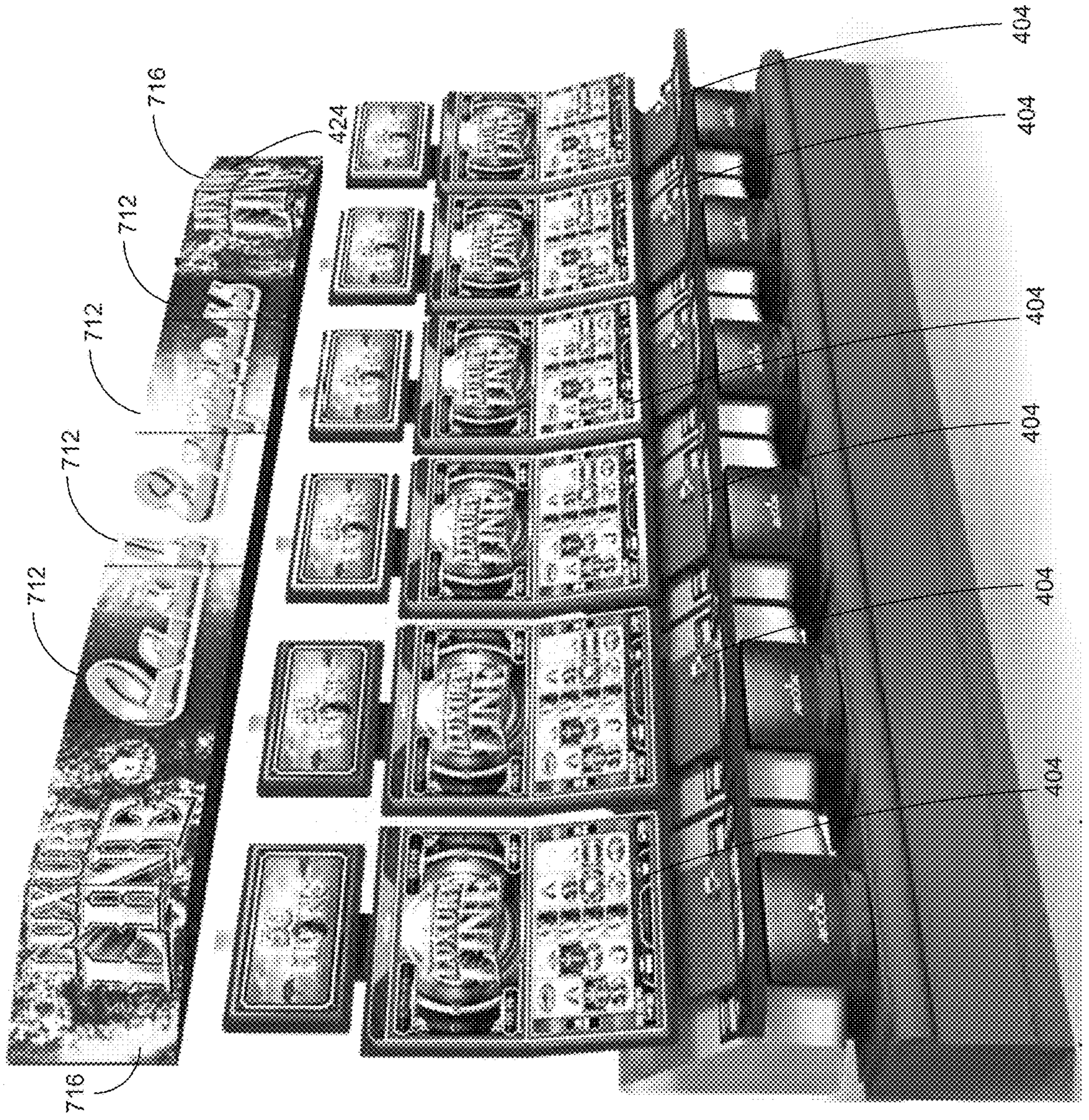
FIGS. 9A and 9B illustrate an embodiment of a third wall gaming machine bank.
Figure 9B:
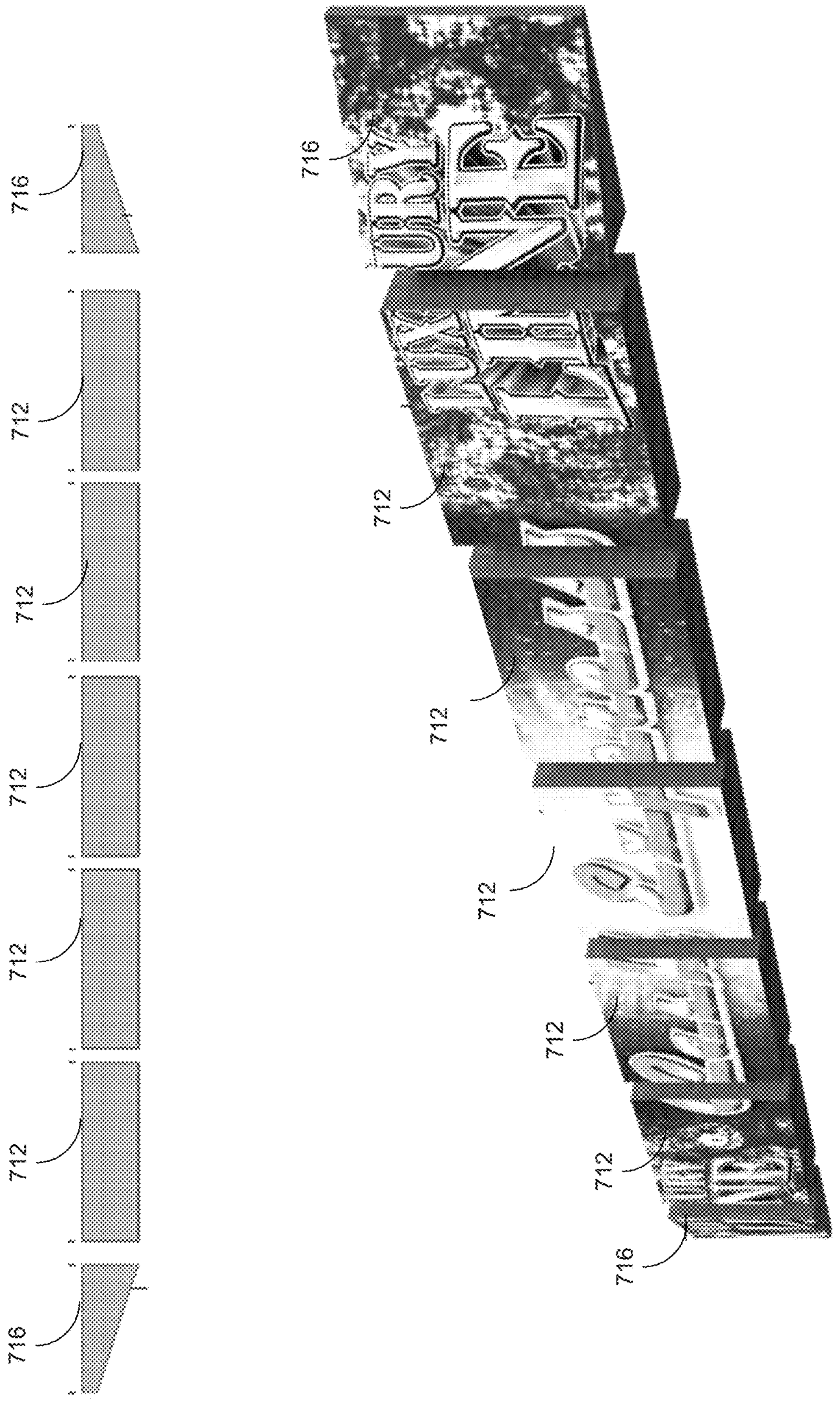

FIG. 9A illustrates an embodiment of a third wall gaming machine bank 900, wherein like numerals refer to like parts. The third wall gaming machine bank 900 includes six (6) electronic gaming machines 404 (of FIG. 4A) arranged along a wall (not shown). The second wall gaming machine bank 800 also includes a third wall modular overhead display 908 that further includes five basic wall display module 712 sandwiched between two end wall display modules 716. FIG. 9B illustrates a top view and a perspective view of the third wall modular overhead display 908 for use with the third wall gaming machine bank 900 of FIG. 9A.

Figure 10A:
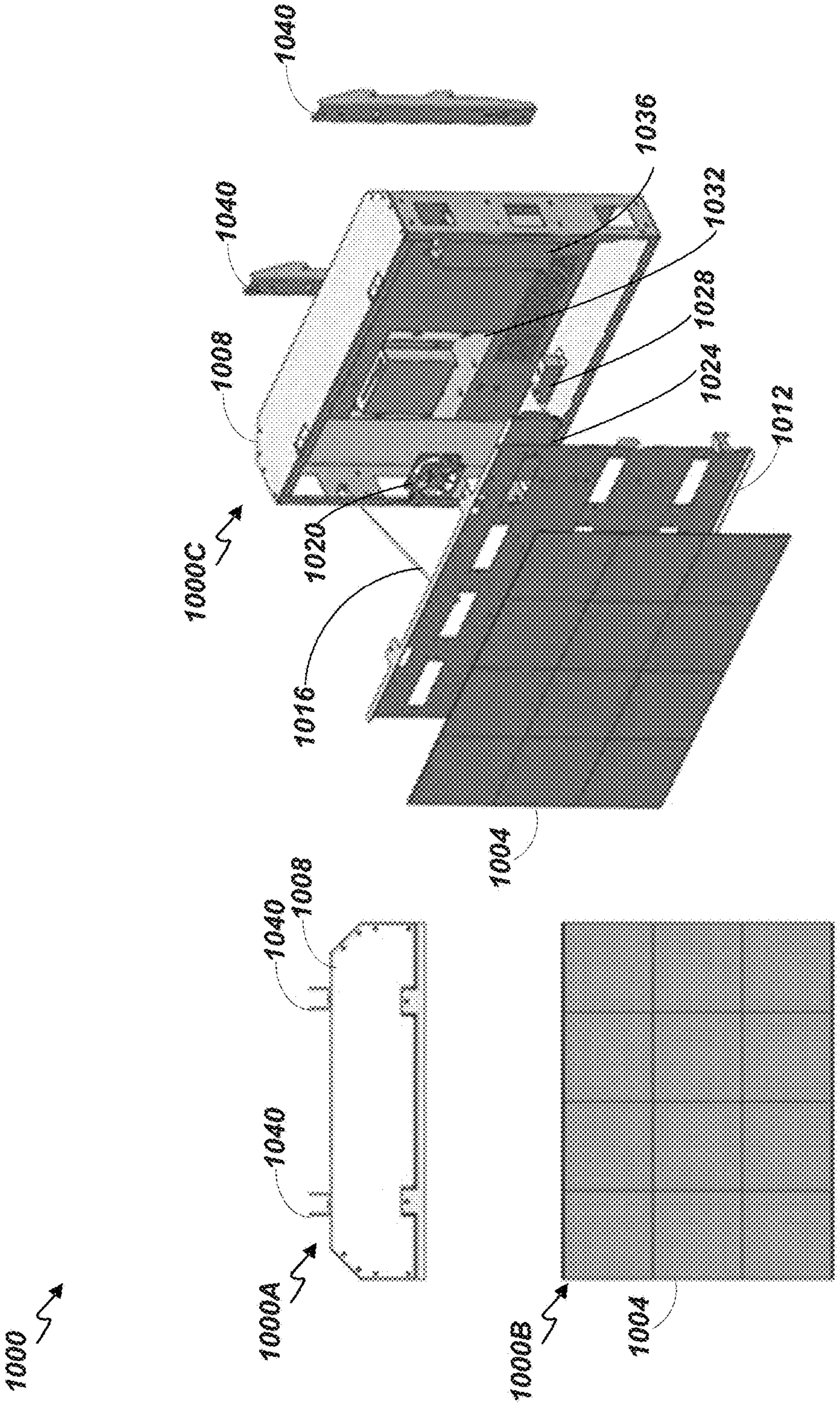
FIGS. 10A and 10B illustrate an embodiment of a base housing module.
Figure 10B:
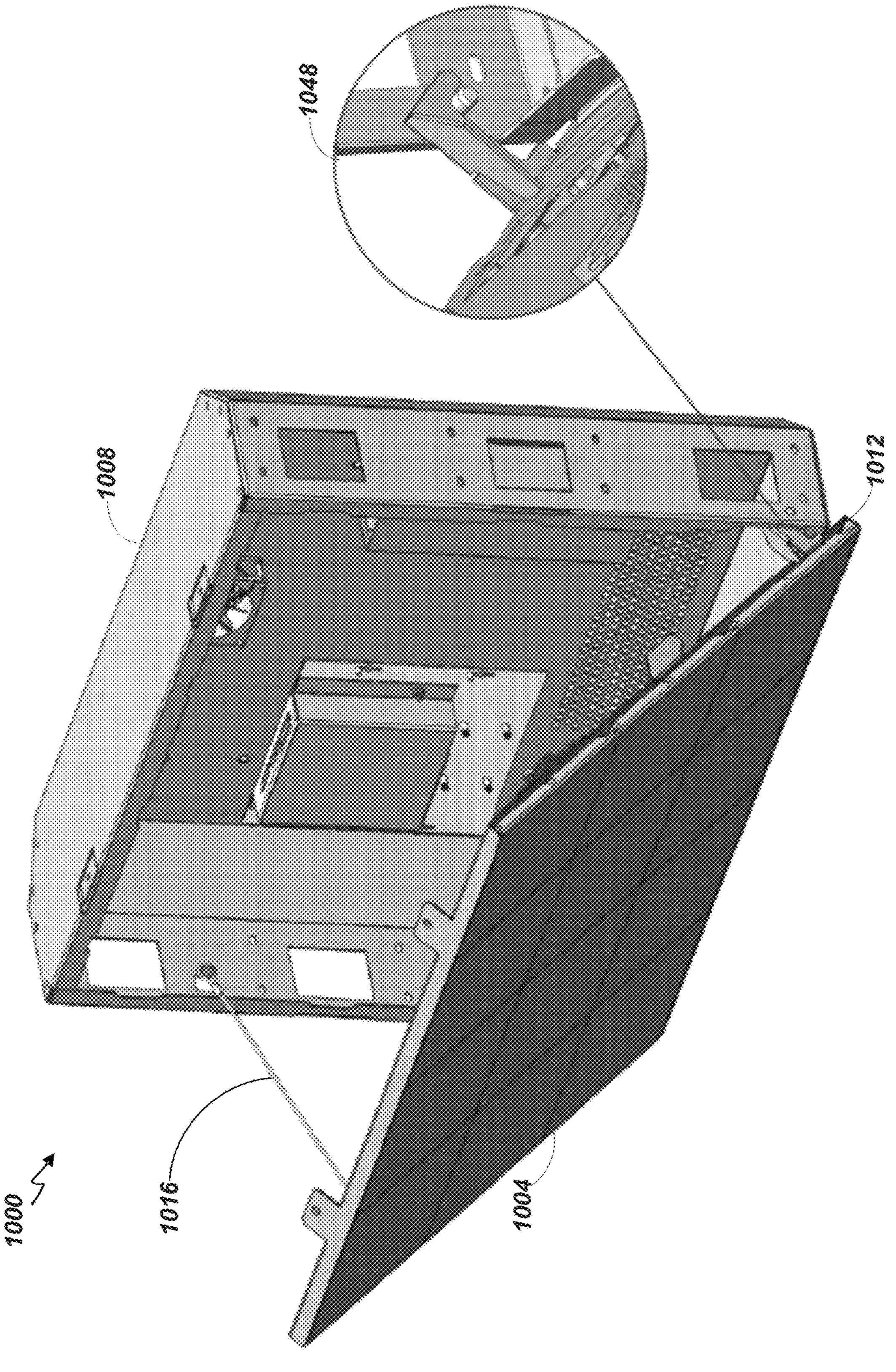

FIGS. 10A and 10B depict a basic building block similar to the base display module 416 for a multi-module overhead display assembly similar to the first modular overhead display 408, as depicted in FIGS. 4A-4G. The basic building block, in some embodiments, comprises a base housing module 1000. The base housing module 1000 may be connected in a variety of configurations to create varying sized and shaped overhead display assembly for gaming machines and banks of gaming machines.

Turning to FIG. 10A, FIG. 10A illustrates a top view 1000A, a front view 1000B, and an exploded perspective view 1000C of a base housing module 1000. The base housing module 1000 comprises display boards or display panels 1004, which is similar to the display panels 424 of FIG. 4A, mounted on a mount panel 1012 that is attached or integral to a base housing module 1008. The base housing module 1000 may be constructed incorporating relatively lightweight material, where possible. The mount panel 1012 for the end display module 412 may be shaped or arranged differently to accommodate different end display modules. For example, the end display module 412 may include three mount panels that accommodate display panels 424 on all three mount panels. For another example, the end wall display module 716 may include a contoured panel to accommodate the display panels 424.

Some or all of the display boards or display panels 1004 may be fixed or detachably mounted on a mount panel 1012. The display boards or display panels 1004 are one or more of a high-resolution LCD, plasma, LED, or OLED panel, which may be flat or curved, a cathode ray tube, or other conventional electronically controlled video monitor to the extent suitable for modular overhead display applications. Embodiments of the display boards or display panels 1004 may employ enhanced pixel technology to enhance resolution, viewing from distance or at any angle, or enable holographic projection. In some embodiments, the multi-module overhead display assembly provides seamless LED panels from display to display, housing module to housing module.

The display boards or display panels 1004, when assembled, may form a matrix of display boards or display panels 1004, as seen in FIG. 10A. The matrix of display boards or display panels 1004 may display a single image across all the display panels 1004, discrete images in each display panel 1004 or some combination thereof. The display boards or display panels 1004 may be controlled by a panel or board controller (not shown) housed in the base housing module 1008 or at a place remote from the base housing module 1000. The display boards or display panels 1004 may be individually removed if one becomes damaged or needs repair without disturbing the other panels. In other embodiments, all of the display boards or display panels 1004 in the matrix are removed in a single unit.

In the embodiment shown, the display boards or display panels 1004 are a matrix of 3×4 (or twelve total) individual display boards or panels. In other embodiments as shown below, other configurations, for example, 3×1, 4×4, 3×3, 3×5, and the like, may include other numbers of display boards or display panels 1004. In an embodiment, each of the display boards or panels 1004 has a dimension of 6.3"×6.3". The sizing of the display boards or display panels 1004 for all housing modules to be uniformly sized allows for the use of fewer total parts for the assembly and repair inventory of each housing module. In other embodiments, however, the display boards or display panels 1004 may have a variety of dimensions, and/or different sizes to allow for different implementation needs.

The display boards or display panels 1004 are connected to mount panel 1012. The mount panel 1012 may be configured to permit other hardware and wire connections. The display boards or display panels 1004 may be mounted on separate movable mounts (not shown) that may be, in turn, mounted to the mount panel 1012. Such a configuration allows telescoping and other movement of the display boards or display panels 1004. Such movement may be automatically controlled. The mount panel 1012 is attached to the base housing module 1008. In an embodiment, the mount panel 1012 is attached to the base housing module 1008 via an attachment structure, such as a tethering cable 1016. Other attachment structures, such as, for example, hinges, snaps, straps, lanyards, and the like may be used. Other display panel 424 dimensions might be used in other embodiments.

The base housing module 1008 may include a cooling system. An embodiment of the cooling system comprises a cooling fan 1020 that may circulate air within the base housing module 1008 and/or remove heat through one or more ventilating vents. Such heat generated by the display boards or display panels 1004 and by other operating components in the base housing module 1008, for example. The cooling system may be active, passive or some combination.

The base housing module 1008 may further include operating components in or on the base housing module 1008, such as a receiver card 1024, a switch box 1028, a sending card 1032, and a power supply 1036. One or more of the operating components may be connected to a controller (not depicted). The controller may send and receive data to the receiver card 1024. The controller may be part of a server, like a media server.

In some embodiments, the base housing module 1008 may serve to house a central controller that centrally controls panel driving data being communicated to other connected base housing modules. That is, panel driving data from the one or more server computers 102 of FIG. 1 or game controller 202 of FIG. 2A, and a power supply 1036, may be redirected from the sending card 1032 of the base housing module 1008 to control one or more connected housing modules. In turn, the housing modules may relay the panel driving data to one or more other connected housing modules. Yet, in other embodiments, each of the one or more connected housing modules may control its own display boards or display panels 1004. The display boards or display panels 1004 may be controlled as part of a single network or divided into multiple networks.

The receiver card 1024 may receive data to drive the display board or display panel 1004, and may also communicate data to other housing modules. That is, the receiver card 1024 may receive the panel driving data from the one or more server computers 102 of FIG. 1 or game controller 202 of FIG. 2A. The receiver card 1024 may be included in each display board or display panel 1004, or it may be a discrete box for controlling more than one display board or display panel 1004 of multiple housing modules. In some embodiments, the switch box 1028 may activate the display boards or display panels 1004.

The sending card 1032 may communicate, relay, route, or send panel driving data. The sending card 1032 may include receiver and transmitter circuitry. The sending card 1032 may employ one of various communications protocols, e.g., Transmission Control Protocol and Internet Protocol (TCP/IP). All communications may be secured via encryption, for example, as may be needed for the application or regulatory authorities. Various encoded formats for media or other data content, such as digital video, may be employed.

A power supply 1036 may supply AC power that may be transmitted to each of the display boards or display panels 1004. Each display board or display panel 1004 may be separately powered. Power may be supplied by various arrangements, including switched mode power supply units, faraday cages, smart-power distribution units based on power demand or control needs, and fail-safe power mode units when a display board or display panel 1004 fails. The power supply 1036 may integrated into other operating components or more than one power supply 1036 may be dedicated to a housing module or operating component.

In some embodiments, the base housing module 1008 may be secured to a mechanical support structure. In one embodiment, the mechanical support structure may comprise a set of hanger rails 1040, and a wall or other supporting structures on which the set of hanger rails 1040 may position the base housing module 1000 over the gaming machine or bank of gaming machines. Various mechanical support structures may be employed. In the embodiment shown, the base housing module 1008 is a generally rectangular housing. In other embodiments shown below, other housings of different sizes and shapes may also be used. In some embodiments, the end wall display modules 716 or the end display module 412 may also include some or all of the cooling system and the operating components of the base display module 416, such as, for example, the receiver card 1024, the switch box 1028, the sending card 1032, and the power supply 1036.

FIG. 10B illustrates another view of the display boards or display panels 1004 of FIG. 10A being attached to the base housing module 1008. As shown, the mount panel 1012 is moveably connected to the base housing module 1008 with the tethering cable 1016. This is an embodiment that permits the opening and closing of the base housing module, which may enable servicing of the base housing module, among other things. FIG. 10B also shows that the mount panel 1012 is in a hinge arrangement 1048 with the base housing module 1008. Other embodiments may fix the display boards or display panels 1004 to the housing, and may or may not permit access to areas within the base housing module 1008.

Figure 10C:
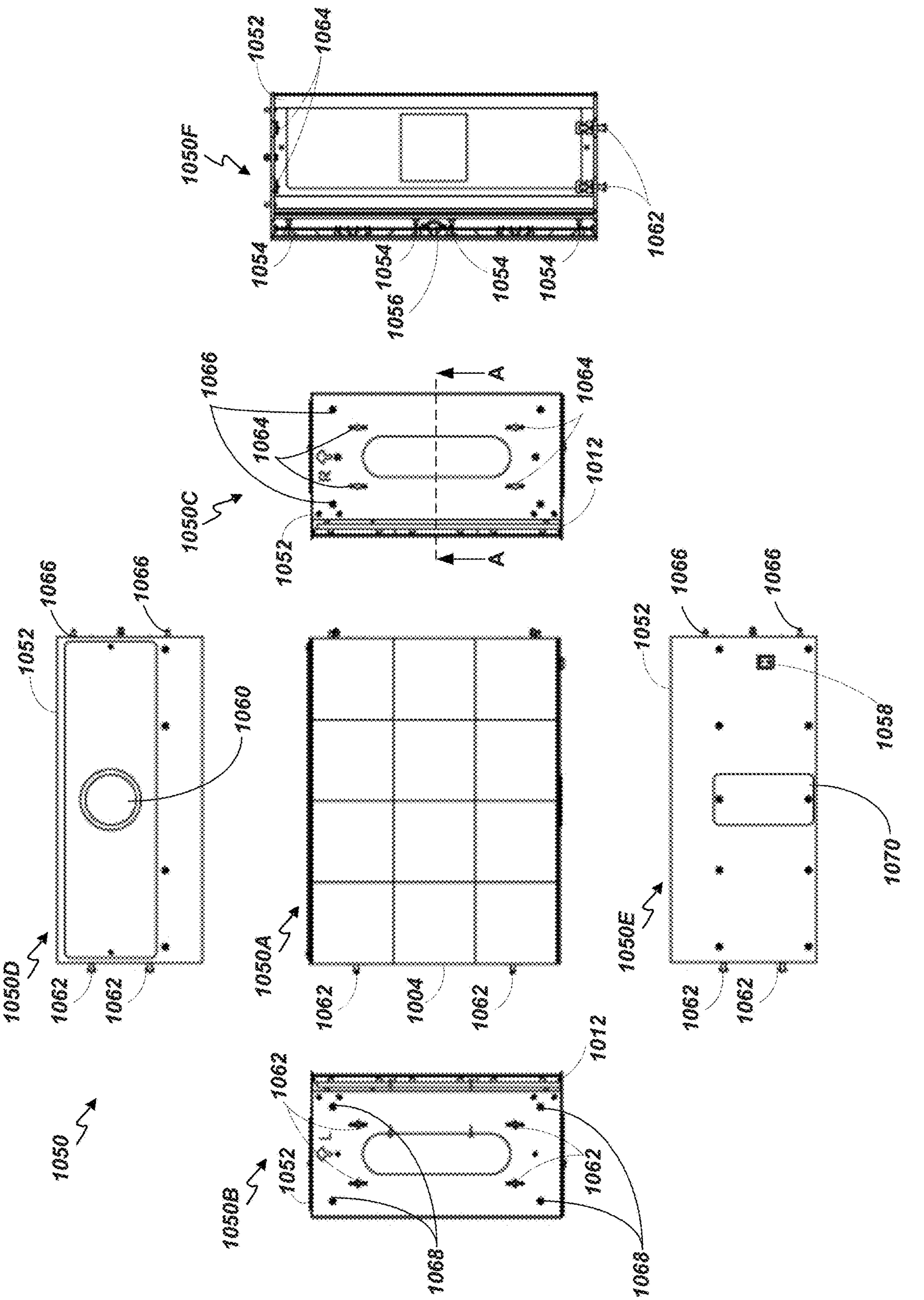
FIGS. 10C and 10D illustrate an alternative base housing module in different perspective views.

FIG. 10C illustrates a front view 1050A, a left side view 1050B, a right side view 1050C, a top view 1050D, a bottom view 1050E, and a sectional view 1050F of the alternative base housing module 1050 viewed along sectional line A-A of the right side view 1050C, wherein like reference numerals refer to like parts. Similar to the base housing module 1000, the alternative base housing module 1050 may also comprise display tiles, display boards or display panels 1004 mounted on the mount panel 1012 that is attached or integral to an alternative housing 1052. The alternative base housing module 1050 may also be constructed incorporating relatively lightweight material, where possible. In some embodiments, the alternative base housing module 1050 may only weigh about 25 Kg (about 50 lbs.), even when the alternative base housing module 1050 is fully loaded with its components.

Similar to the base housing module 1008 shown in FIG. 10A, the display tiles, display boards or display panels 1004 are also attached to mount panel 1012. However, as shown in FIG. 10C, the mount panel 1012 may be fastened or mounted on the alternative housing 1052 with a number of magnetic fasteners 1054. The mount panel 1012 may additionally include a lanyard hook 1056 positioned thereon to permit access and movements of the mount panel 1012 to or away from the alternative housing 1052, which may be a structurally hollow section. As shown in the bottom view 1050E, the alternative housing 1052 also includes an electrical switch 1058 to manually power one or more components of the alternative base housing module 1050.

Similar to the base housing module 1008, the alternative housing 1052 may also include a cooling system with one or more cooling fans (similar to the cooling fan 1020 shown in FIG. 10A) to circulate air generated within the alternative housing 1052 and/or remove heat through one or more ventilating mesh 1060 as shown in the top view 1050D. Other forms of ventilation technology may also be used, concurrently or alternatively.

The alternative housing 1052 may be connectable to the base housing module 1008, junction housing 1108, end housing 1208, or another housing module to form a single display unit via one or more locking devices, such as, for example, compression latches 1062 and latch accesses 1064 as shown in the left side view 1050B and the right side view 1050C. For example, during implementation, the compression latches 1062 on a first alternative housing may be inserted into the latch accesses 1064 on a second alternative housing to releasably secure the first alternative housing to the second alternative housing. The alternative housing 1052 also includes a plurality of protrusions 1066 releasably insertable into a different alternative housing, or other housings, that includes corresponding locating tabs 1068.

A cover plate 1070 is shown with respect to the bottom view 1050E to cover the alternative housing 1052 when the alternative housing 1052 is not supported by any mounting structure or system (such as mount system 1616 of FIG. 16, which will be discussed later). When the cover plate 1070 is secured to the alternative housing 1052, components within the alternative housing 1052 may not be readily accessible.

Figure 10D:
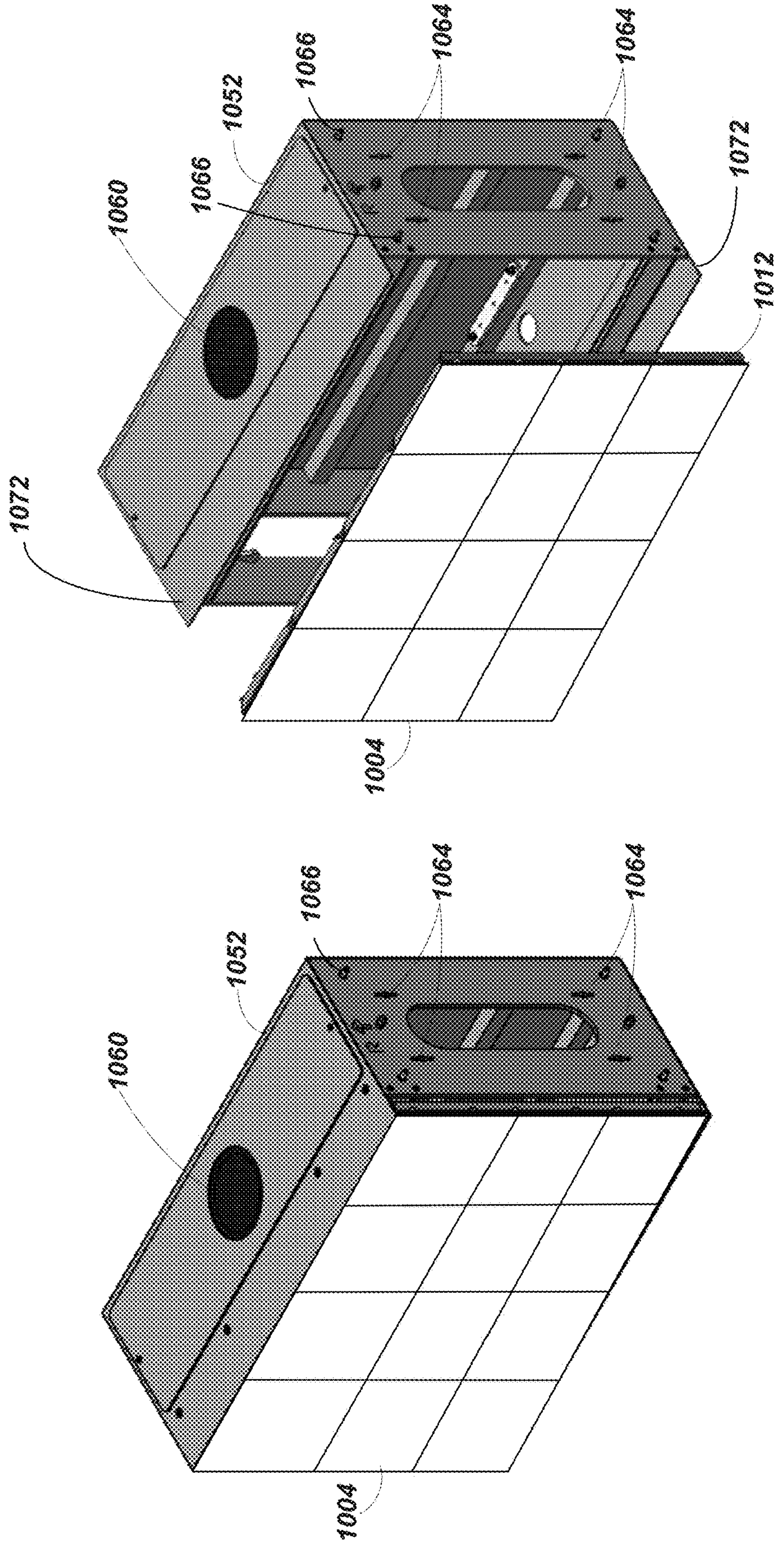

FIG. 10D illustrates the alternative base housing module 1050 with an attached panel and a detached panel, respectively, wherein like reference numerals refer to like parts. In particular, the alternative housing 1052 includes frame extensions 1072 to receive and/or seat the display panels 1004 and/or the mount panel 1012. In some embodiments, the mount panel 1012 may be fastened to the alternative housing 1052 with the magnetic fasteners 1054. In some embodiments, the magnetic fasteners 1054 are PMYP-D12—Neodymium M3 female thread pot magnets. That is, unlike the base housing module 1000, the mount panel 1012 may be secured to the alternative housing 1052 without the tethering cable 1016 or in addition to the tethering cable 1016.

Figure 11A:
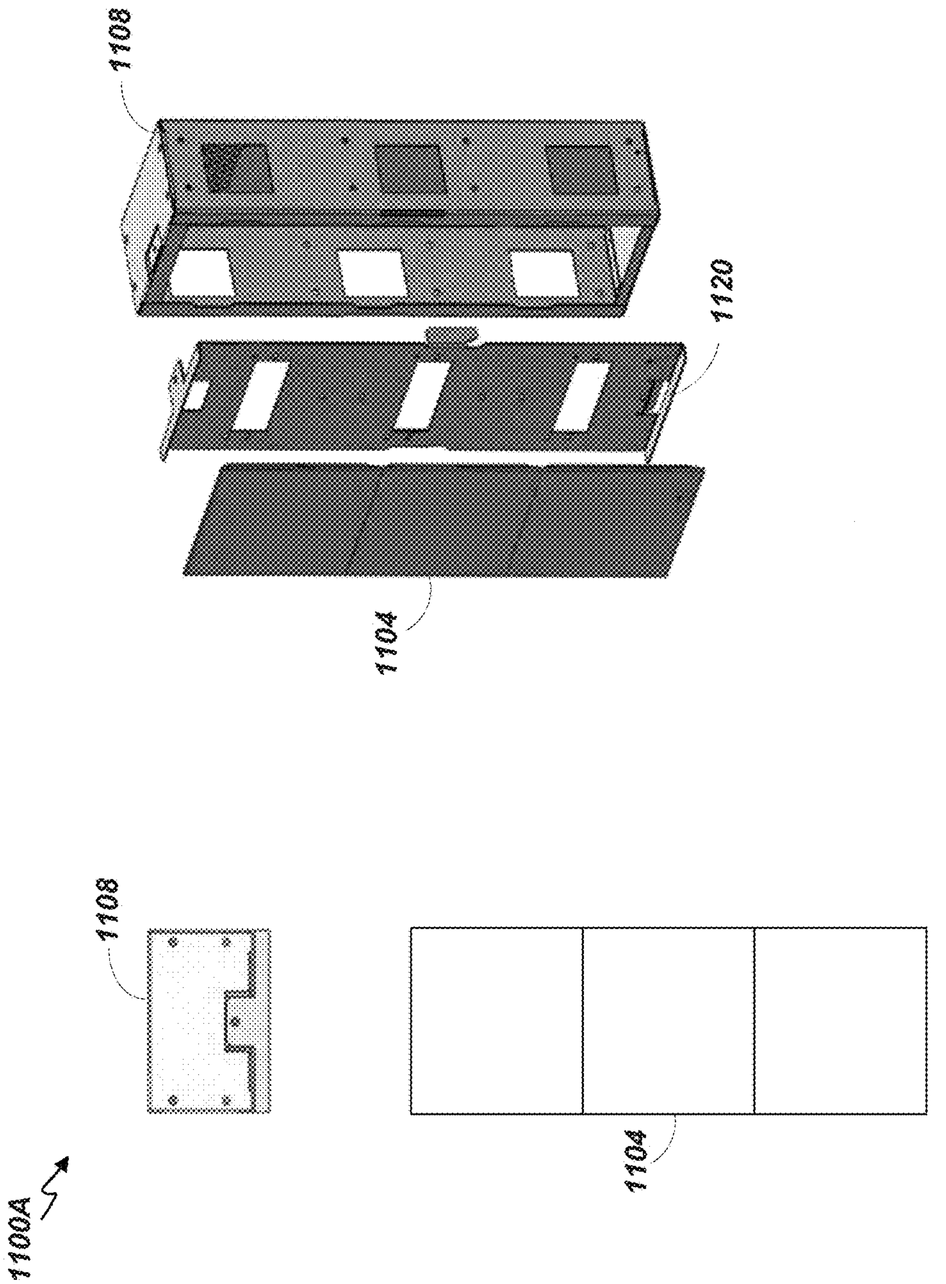
FIG. 11A illustrates an embodiment of a junction housing module in a rectangular configuration.

FIG. 11A illustrates a junction housing module 1100A. The junction housing module 1100A comprises display boards or panels 1104 mounted on a second mount panel 1120 that is attached or integral to a junction housing 1108, similar to other housings. The junction housing module 1100A may be constructed incorporating relatively lightweight material, where possible, and may employ housing material similar to that for the base housing module 1000.

In an embodiment, the display boards or panels 1104 form a matrix of 3×1 (or three total) display boards or panels. The junction housing 1108 may include some or all of the cooling system and the operating components of the base housing module 1000, such as, for example, the receiver card 1024, the switch box 1028, the sending card 1032, and the power supply 1036. In other embodiments, the junction housing 1108 may be structured to support the display boards or panels 1104 with the second mount panel 1120 tailored to the 3×1 matrix of LED panels.

In an embodiment, the junction housing 1108 may be a generally rectangular-shaped housing that is sized and shaped to be connectable to the base housing module 1008 or another housing module to form a single display unit. The housing modules, e.g., the base housing module 1000 and the junction housing module 1100A, may be releasably connected via a locking mechanism. In some embodiments, the junction housing 1108 may employ locking mechanism such as compression latches 1062 and latch accesses 1064, and protrusions 1066 and corresponding locating tabs 1068, like those shown in FIG. 10C. Releasably connecting the housing modules allows the display dimensions to increase or decrease, and allows for the interchange and exchange of housing modules, which enhances service and repair capabilities when the housing modules can be disassembled in part. In some embodiments, the junction module 1105 may include plug-and-play connectors (not shown) that allow the junction housing 1108 to be connected to and communicate with other housings. In still other embodiments, however, the locking mechanism may only lock the junction housing 1108 to another housing, while the operating components may be connected in other manners. The junction housing 1108 may also be secured to a mount system similar to that employed with the set of hanger rails 1040.

Figure 11B:
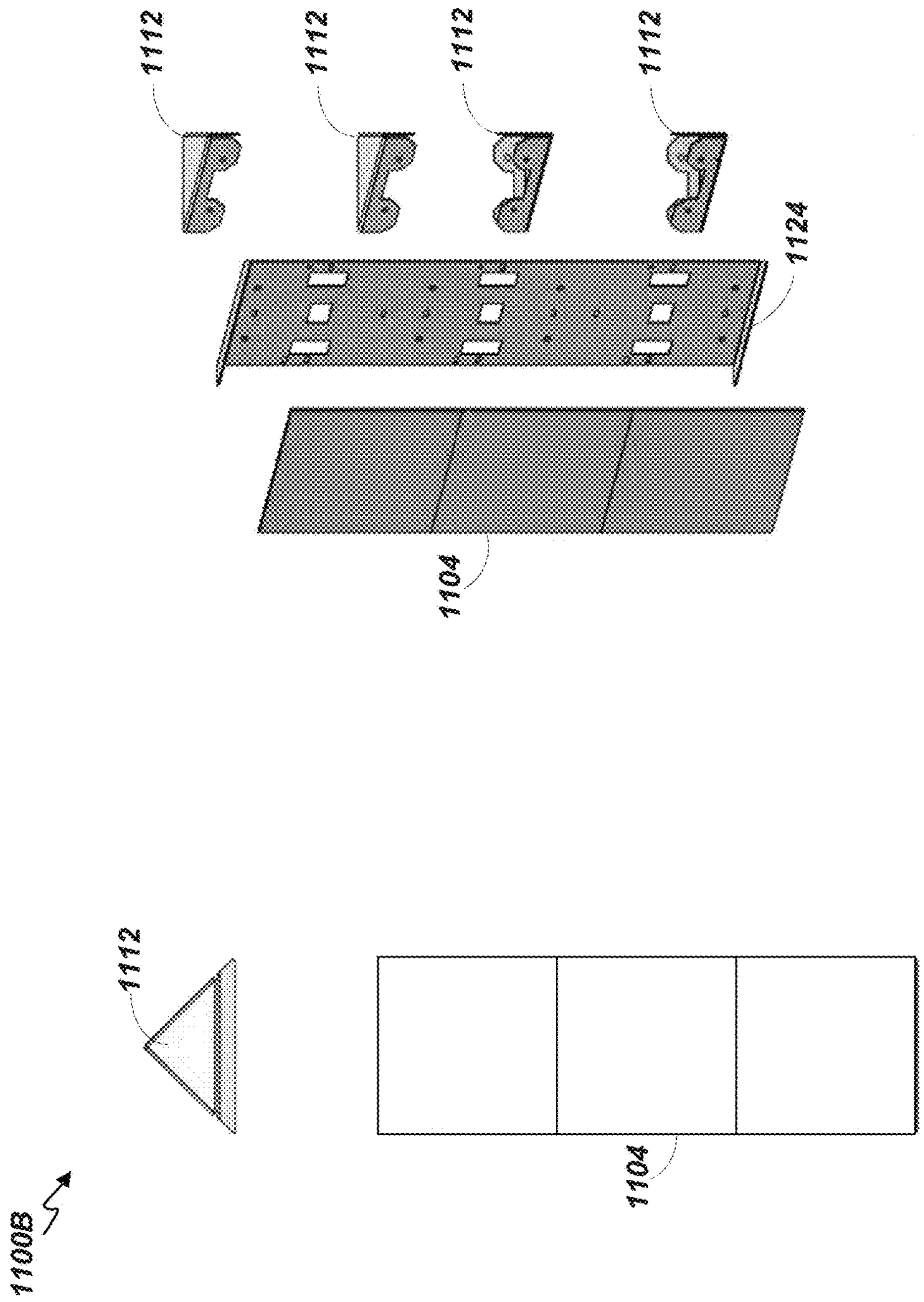
FIG. 11B illustrates an embodiment of the junction housing module of FIG. 11A with a single-column corner assembly.

FIG. 11B illustrates a junction housing module 1100A of FIG. 11A configured with corner brackets 1112. Similar to FIG. 11A, the display boards or panels 1104 are a matrix of 3×1 (or three total) individual boards or panels, e.g., LED panels. However, instead of extending the base housing module 1000 with a junction housing module 1100A that has a generally rectangular-shaped housing, the junction housing module 1100A with corner brackets 1112 provides a turn or bend to the base housing module 1000 or other housing modules forming the display unit. Thus, the junction housing module 1100A can extend the dimension of the display unit similar to the junction housing module 1100A, but in a different direction. The junction housing module 1100A may provide a display curvature for the display unit when curved display boards or panels 1104 are used. Junction housing module 1100A may be controlled by operating components housed within junction housing module 1100A or controlled by other housing modules, e.g., base housing module 1000.

Figure 12:
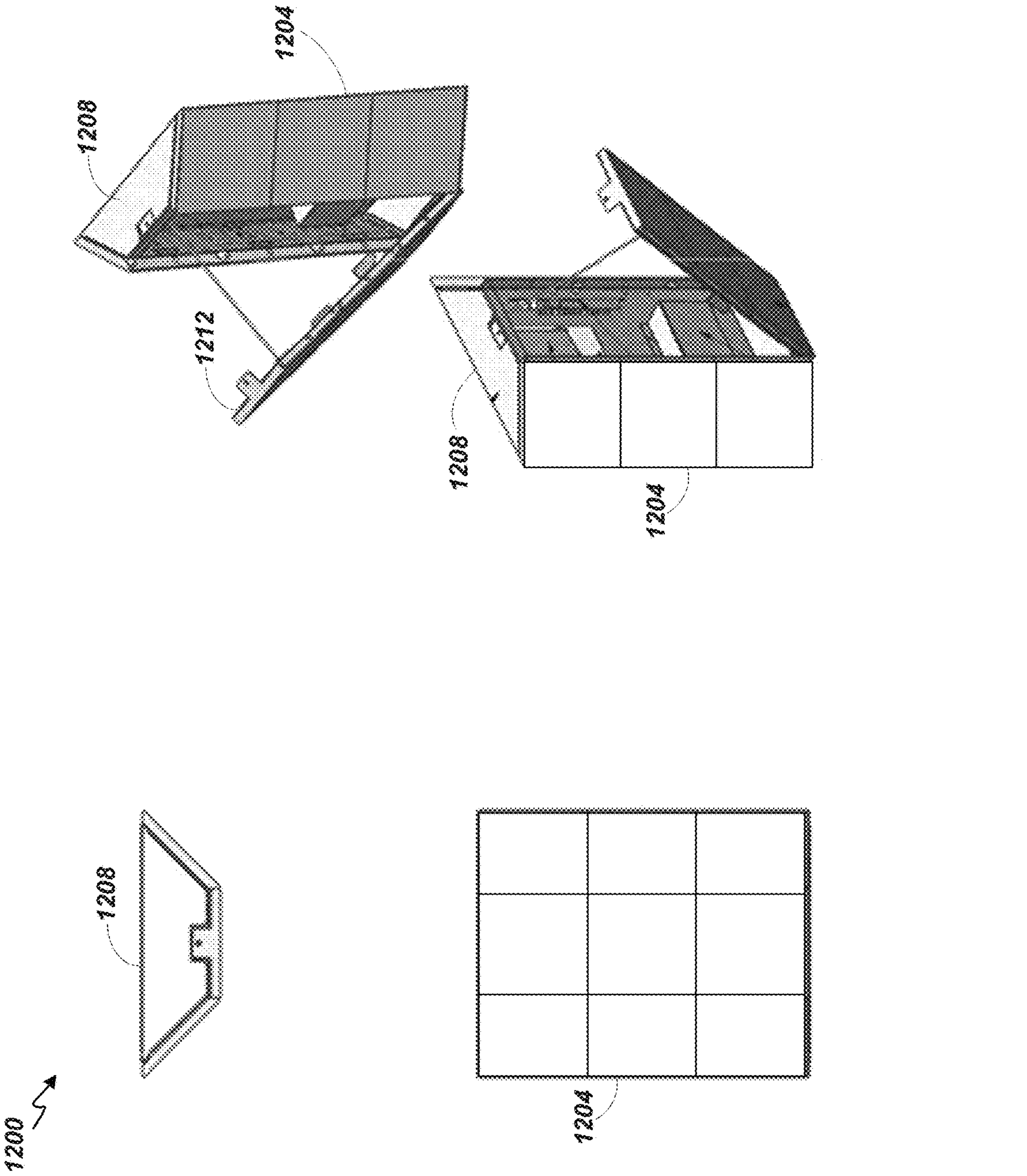
FIG. 12 illustrates an embodiment of an end housing module with a three-column corner assembly.

FIG. 12 illustrates an end housing module 1200. In this embodiment, the end housing module 1200 comprises an end housing 1208, one or more end mounting panels 1212 and display boards or panels 1204. In an embodiment, the end housing module 1200 is formed as a three column module with two of the columns being angled from the third, centrally positioned column. Each of the columns has three of the display boards or panels 1204, e.g., LED panels. In some embodiments, the end housing 1208 may also include some or all of the cooling system and the operating components of the base housing module 1000, such as, for example, the receiver card 1024, the switch box 1028, the sending card 1032, and the power supply 1036. In other embodiments, the base housing module 1008 may be structured to support the display boards or panels 1204 with more than one end mount panel 1212.

In an embodiment, the end housing 1208 may be releasably joined to other housing modules, e.g. the base housing module 1000 or the junction housing module 1100A, by a locking mechanism. Releasably connecting the housing modules, in turn, expands dimensional configurations of the entire display unit. In some embodiments, the end housing module 1200 may provide a 180°-turn or wraparound of the multi-module display assembly.

Figure 13:
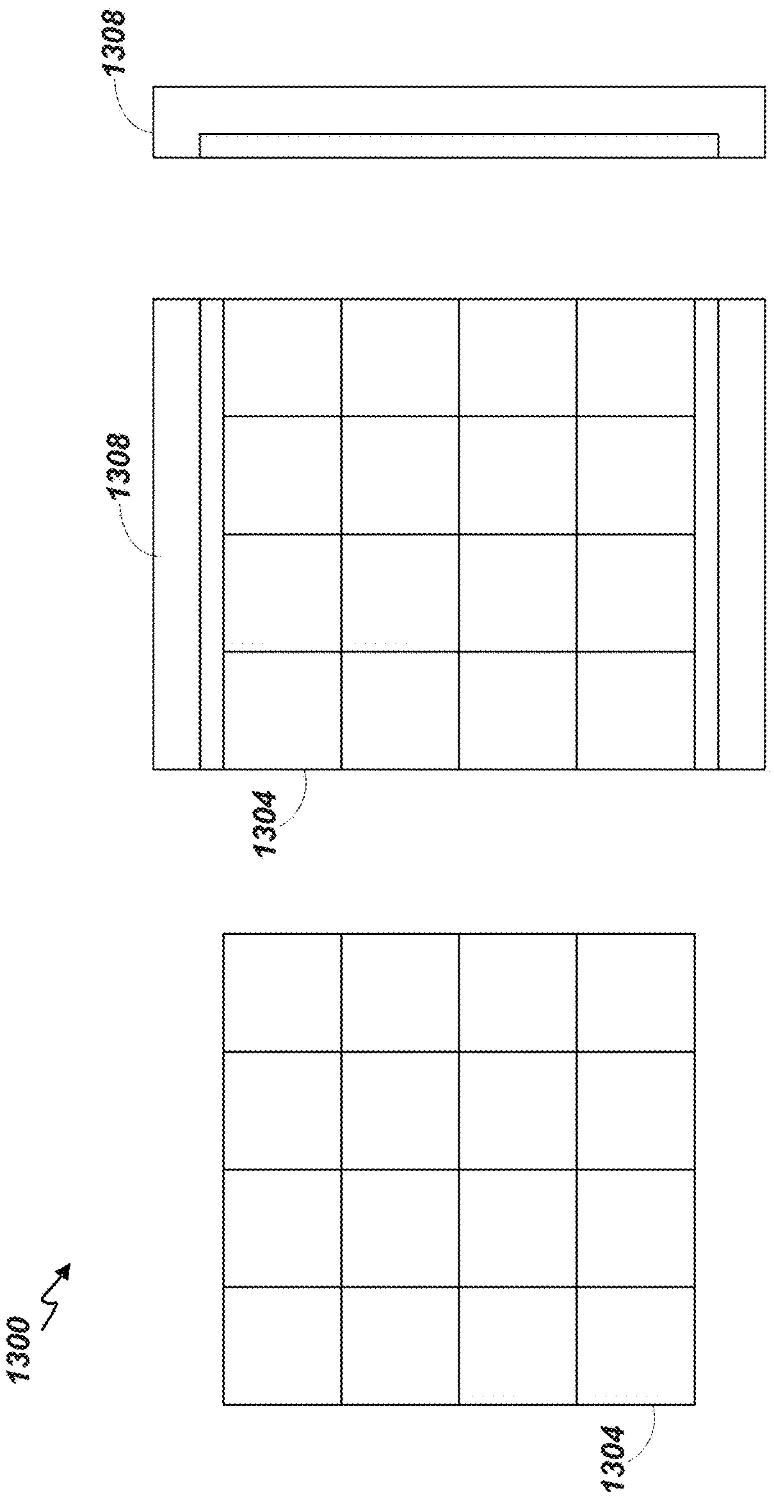
FIG. 13 illustrates an embodiment of an alternative base housing module from a front and a side view.

FIG. 13 illustrates a second base housing module 1300. Similar to the base housing module 1000, second base housing module 1300 comprises a base housing 1308, display boards or panels 1304 and a mount panel (not showing in FIG. 13). The second base housing module 1300, however, has a base housing 1308 that has a thinner profile than the base housing module 1008. Base housing 1308 may be suitable for configurations where the available space is a constraint, where wall mounting is preferred or when the base housing 1308 has smaller operating components, for example. In this embodiment, the display boards or panels 1304 comprise a matrix of 4×4 (or sixteen total) display boards or panels 1304, e.g., LED panels. In some embodiments, the base housing 1308 may also include some or all of the cooling system and the operating components of the base housing module 1000, such as, for example, the receiver card 1024, the switch box 1028, the sending card 1032, and the power supply 1036.

Figure 14:
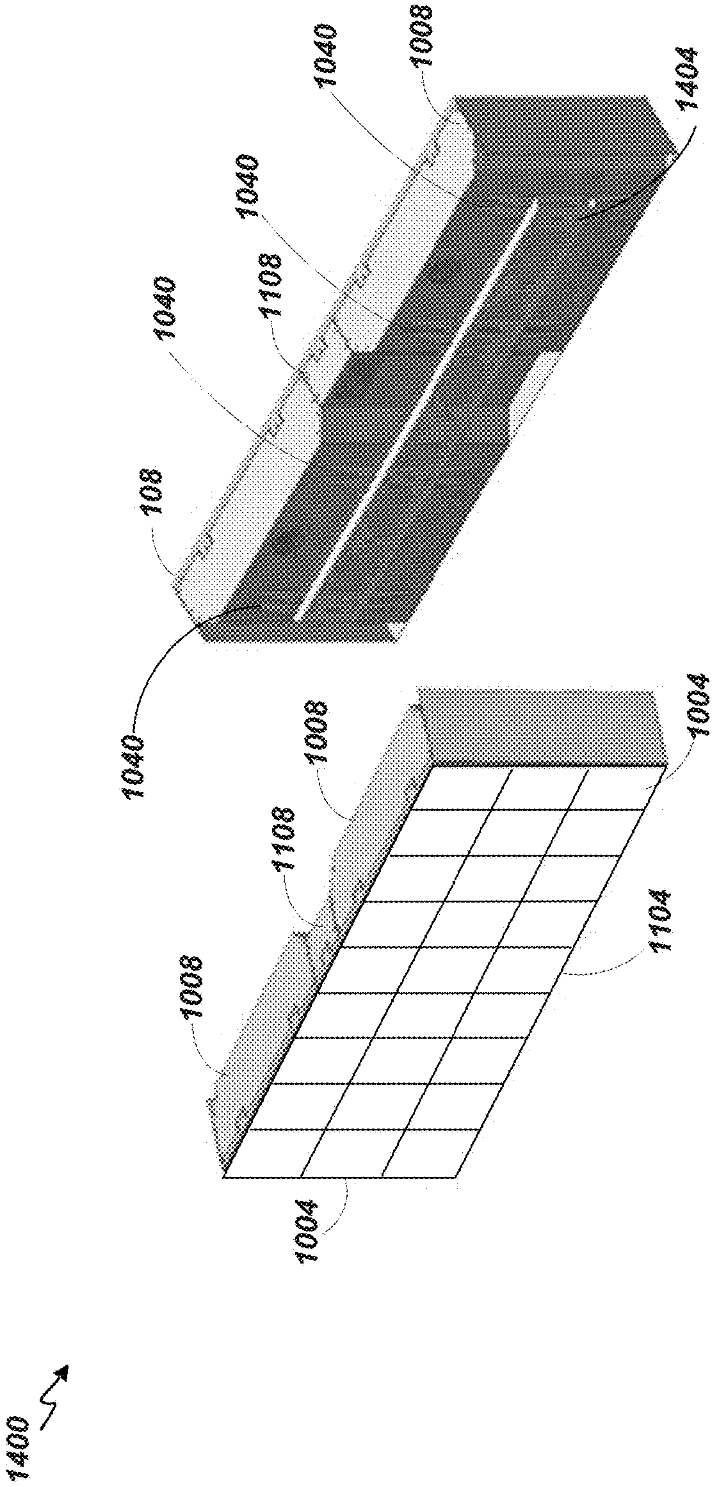
FIG. 14 illustrates an embodiment of a multi-module overhead display assembly for a gaming machine comprising two base housing modules of FIG. 10A joined by a junction housing module of FIG. 11A.

FIG. 14 illustrates an embodiment of a multi-module overhead display assembly 1400. The multi-module overhead display assembly 1400 comprises two base housing modules 1000 of FIG. 10A joined by a junction housing module 1100 of FIG. 11A. In addition, as shown, the hanger rails 1040 of each base housing module 1008 may be mounted to track rails 1404. In some embodiments, though not shown, the track rails 1404 may be, in turn, mounted on a track mechanism for easy installation, replacement and servicing. Alternatively, the multi-module overhead display assembly 1400 may comprise two alternative base housing modules 1050 of FIG. 10C joined by the junction housing module 1100 of FIG. 11A. In such alternative embodiments, the multi-module overhead display assembly 1400 may be supported by one or more mount systems with or without the track rails 1404.

By way of further example, more specifically, a track mechanism on which the hanger rails 1040 are positioned may allow sliding along track rails 1404 or rotation about the track rails (e.g., about a single axis (i.e., one rotational degree of freedom)). In such embodiments, all other axes and rotational axes are secured from movement (i.e., the three linear degrees of freedom and two remaining rotational degrees of freedom). For example, the hanger rails 1040 may be pivotally coupled to the track rails 1404 to permit rotation about track rails 1404 (e.g., the Z-axis) and translation along the track rails 1404 (e.g., the Z-axis), but restricting rotation about the X and Y axes and restricting translational movement along the X and Y-axes. Once the housing modules are disengaged or unlocked, the base housing modules 1000 and the junction housing module 1100 may be rotated or translated into a maintenance position about the track mechanism or they may be removed.

Figure 15:
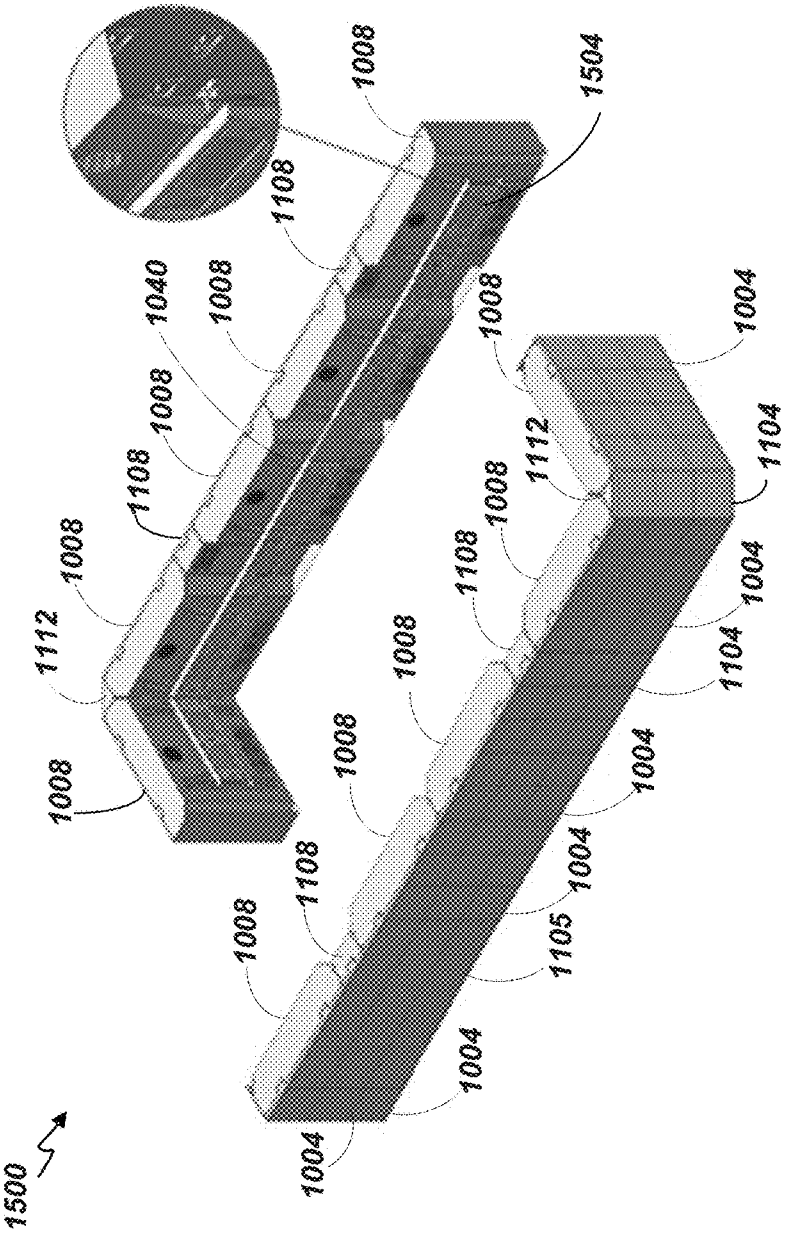
FIG. 15 illustrates an embodiment of a multi-module overhead display assembly.

FIG. 15 illustrates a multi-module overhead display assembly 1500. The multi-module overhead display assembly 1500 comprises ten base housing modules 1000, four junction housing modules 1100A and two junction housing module with the corner brackets 1100B that are joined together to form a unitary display assembly. As may be appreciated, the modularity of the multi-module overhead display assembly 1500 allows for various assembly configurations. For example, the multi-module overhead display assembly 1500 is shown in two assembled halves that may be joined together to form a single display assembly. The multi-module overhead display assembly 1500 may be mounted on track rails 1504 that functions similarly as the track rails 1404 of FIG. 7. In the embodiment shown in FIG. 8, the multi-module overhead display assembly 1500 may be used as an overhead signage for a bank of back-to-back gaming machines, detailed hereinafter. Alternatively, the multi-module overhead display assembly 1500 may comprise ten alternative base housing modules 1050 of FIG. 10C, four junction housing modules 1100A, and two junction housing module with the corner brackets 1100B.

Figure 16:
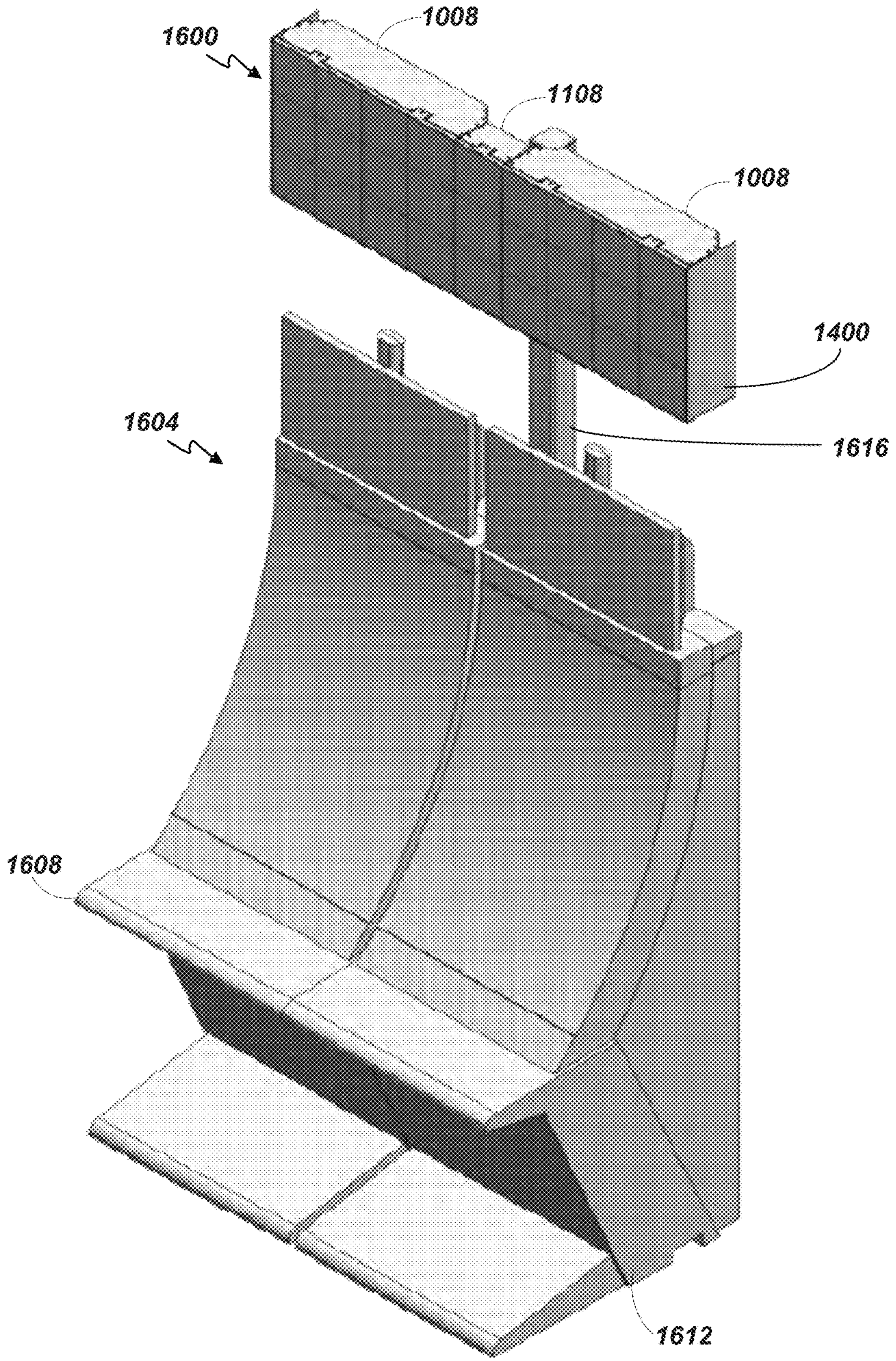
FIG. 16 illustrates an embodiment of a first bank of gaming machines with a multi-module overhead display assembly mounted on a mounting system.

FIG. 16 illustrates a gaming assembly having a multi-module overhead display assembly 1600 with a bank of gaming machines 1604. The multi-module overhead display assembly 1600 is assembled from the multi-module overhead display assembly 1400 of FIG. 14. The bank of gaming machines 1604 includes gaming machines 1608, 1612, arranged side by side. The multi-module overhead display assembly 1600 is supported by a mount system 1616 that may permit the overhead display assembly to be viewable to players or users of the gaming machines 1608, 1612. In some embodiments, the mount system 1616 may include a fixed structure that couples the multi-module overhead display assembly 1600 to one or more of the two side-by-side gaming machines 1608, 1612. In other embodiments, the mount system 1616 may include an extendible mechanism that couples the multi-module overhead display assembly 1600 to the one or more of the two side-by-side gaming machines 1608, 1612. With the extendible mechanism, the multi-module overhead display assembly 1600 may initially station above or atop of, or in spatial relationship with the two side-by-side gaming machines 1608, 1612 in one gaming or attraction mode, and may be controllably extended or elevated from the two side-by-side gaming machines 1608, 1612 to a predetermined height in another gaming or attraction mode. In some other embodiments, however, the multi-module overhead display assembly 1600 may station below the two side-by-side gaming machines 1608, 1612 in one gaming or attraction mode. Similar to the track mechanism discussed above, the mount system 1616 may also be pivotally coupled to the multi-module overhead display assembly 1600 to permit rotation about a vertical axis for alternate overhead display configurations or for maintenance or servicing, for example.

Figure 17:
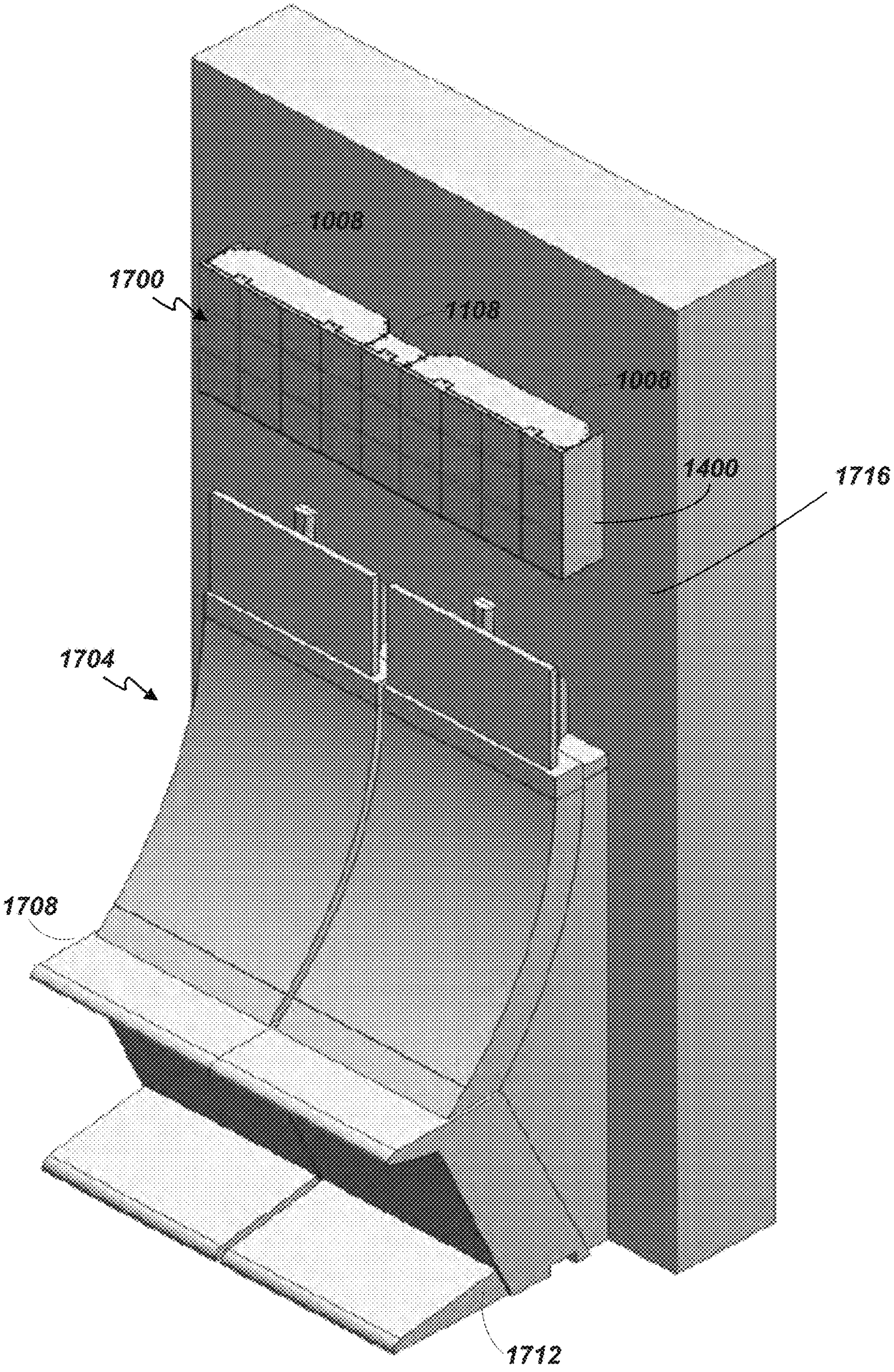
FIG. 17 illustrates an embodiment of a second bank of gaming machines with a multi-module overhead display assembly in wall mounted configuration.

FIG. 17 illustrates a gaming assembly having a multi-module overhead display assembly 1700 mounted on a wall 1716 in relation to a bank of gaming machines 1704. The multi-module overhead display assembly 1700 is assembled from the multi-module overhead display assembly 1400 of FIG. 14. The bank of gaming machines 1704 includes two side-by-side gaming machines 1708, 1712. The multi-module overhead display assembly 1700 is wall mounted on the wall 1716 and in spatial relationship with respect to the two side-by-side gaming machines 1708, 1712. Although not shown, the multi-module overhead display assembly 1700 may be mounted on the wall 1716, for example, via the hanger rails 1040 of FIG. 10A.

Figure 18:
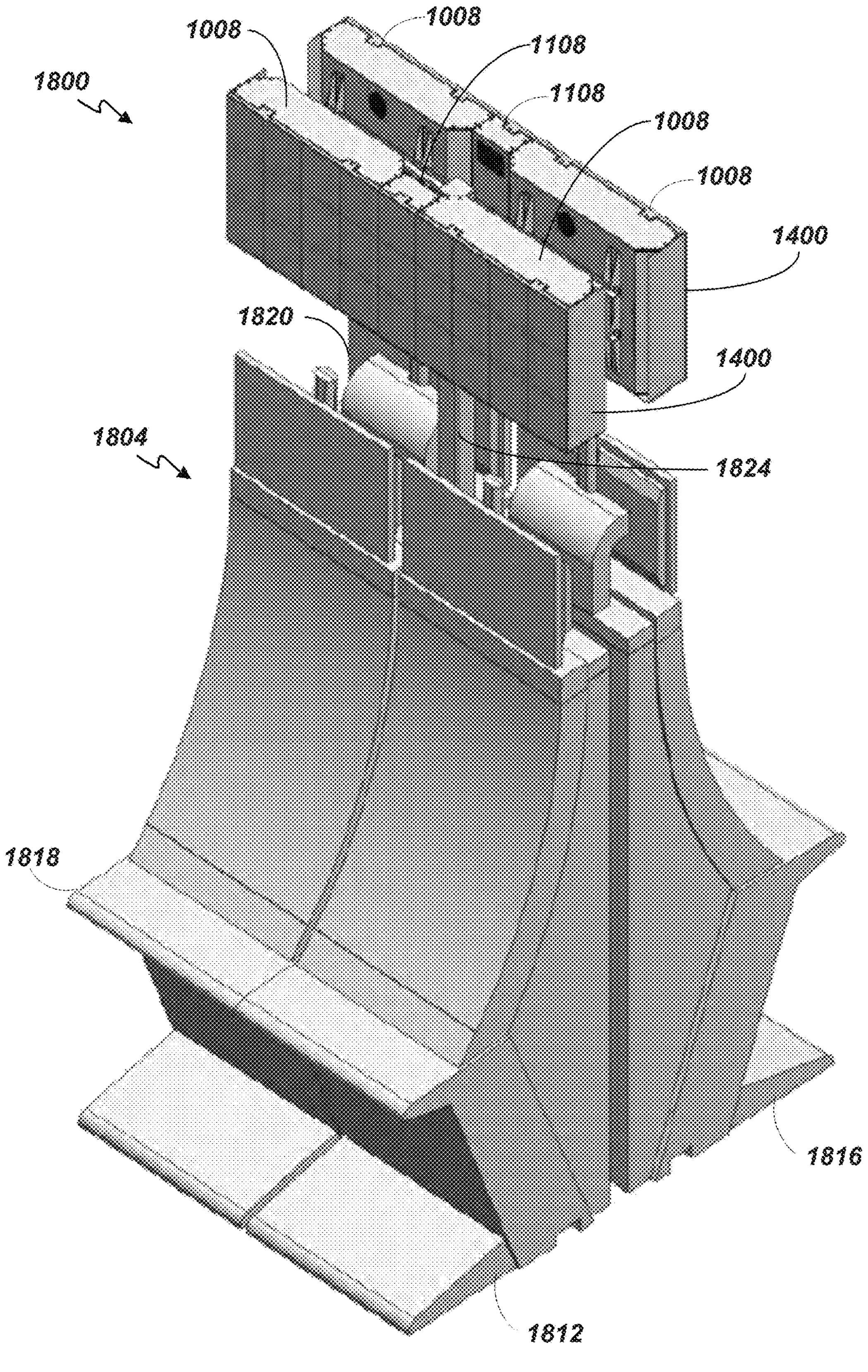
FIG. 18 illustrates an embodiment of a third bank of gaming machines in a back-to-back arrangement with a multi-module overhead display assembly on a mounting system in a back-to-back arrangement.

FIG. 18 illustrates a gaming assembly having a multi-module overhead display assembly 1800 with back-to-back banks of gaming machines 1804. The multi-module overhead display assembly 1800 comprises two sets of multi-module overhead display assemblies 1400 of FIG. 14 arranged in back-to-back relationship. The back-to-back banks of gaming machines 1804 comprise two sets of two side-by-side gaming machines 1808, 1812, 1816, 1820. The multi-module overhead display assembly 1800 is supported by a mount system 1824 and stationed or positioned in spatial relationship with respect to the gaming machines 1808, 1812, 1816, 1820 arranged in two sets of two side-by-side gaming machines, such that multi-module overhead display assembly 1800 may be viewable to a user of at least one or more of the gaming machines 1808, 1812, 1816, 1820. In some other embodiments, however, the multi-module overhead display assembly 1800 may station below the two side-by-side gaming machines 1808, 1812, 1816, 1820 in one gaming or attraction mode. In the embodiment shown, the multi-module overhead display assembly 1800 does not include any junction housing modules with corner brackets 1100B or any end housing modules 1200, e.g., at its ends. In some embodiments, the mount system 1824 may be constructed similarly to the mount system 1616 of FIG. 16.

Figure 19:
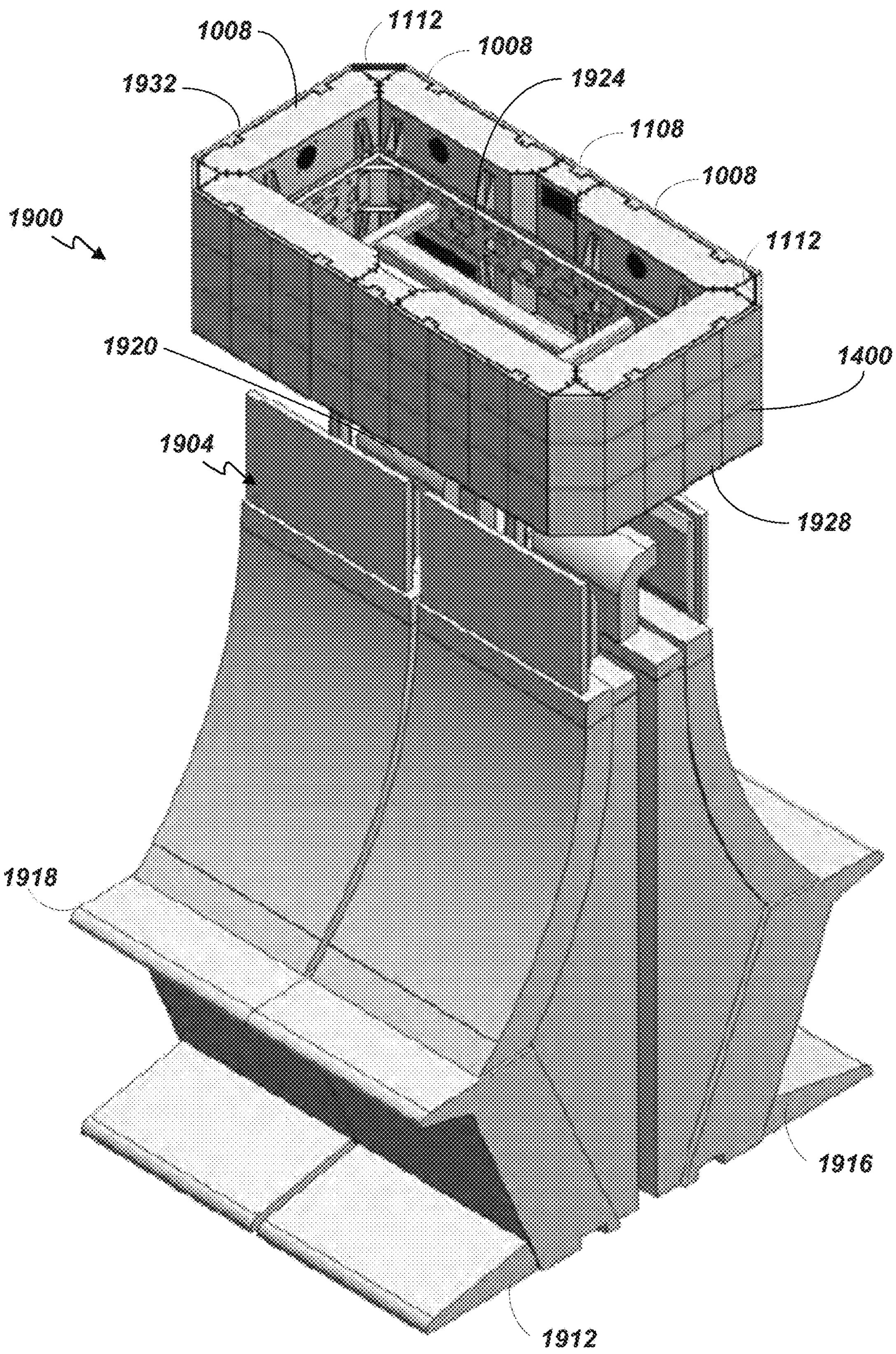
FIG. 19 illustrates an embodiment of a fourth bank of gaming machines in a back-to-back arrangement with a multi-module overhead display assembly on a mounting system in a back-to-back arrangement.

FIG. 19 illustrates a gaming assembly having a multi-module overhead display assembly 1900 with back-to-back banks of gaming machines 1904. The multi-module overhead display assembly 1900 comprises a multi-module overhead display assembly 1500 where each end is connected by two junction housing modules with corner brackets 1100B and a base housing module 1000. The back-to-back banks of gaming machines 1904 comprise two sets of two side-by-side gaming machines 1908, 1912, 1916, 1920. In the embodiment shown, multi-module overhead display assembly 1900 adds display capability around the entire back-to-back banks of gaming machines 1904 that differs from the multi-module overhead display assembly 1400 of FIG. 14 alone. In some other embodiments, however, the multi-module overhead display assembly 1900 may station below the back-to-back banks of gaming machines 1904 in one gaming or attraction mode such that multi-module overhead display assembly 1900 may be viewable to a user of at least one or more gaming machines. The multi-module overhead display assembly 1900 is supported by a fourth mount system 1924 similar to the track rails 1504 of FIG. 15, and additional support structure may be included as needed. In some embodiments, the fourth mount system 1924 may be constructed similarly to the mount system 1616 of FIG. 16.

Figure 20:
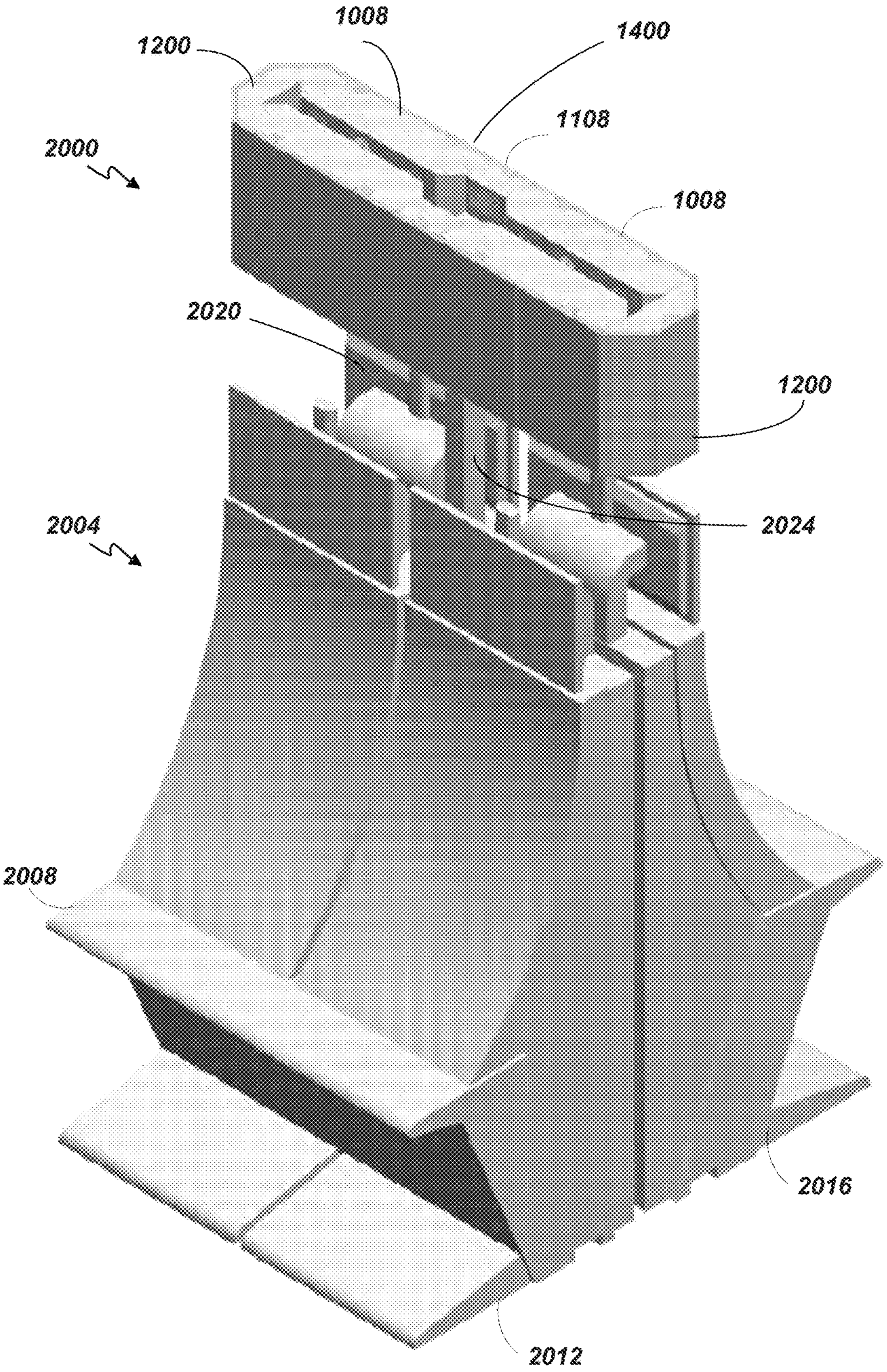
FIG. 20 illustrates an embodiment of a fifth bank of gaming machines in a back-to-back arrangement with a multi-module overhead display assembly on a mounting system in a back-to-back arrangement.

Similarly, FIG. 20 illustrates a gaming assembly having a multi-module overhead display assembly 2000 with back-to-back banks of gaming machines 2004. The multi-module overhead display assembly 2000 comprises a multi-module overhead display assembly 1400 where each end is connected by the end housing module 1200. The back-to-back banks of gaming machines 2004 comprise gaming machines 2008, 2012, 2016, 2020, arranged in two sets of two side-by-side gaming machines.

While similar to the multi-module overhead display assembly 2000 in providing overhead display capability around the back-to-back banks of gaming machines, the multi-module overhead display assembly 1400 has a thinner or narrower overall plan profile, which takes up less volume over the back-to-back banks of gaming machines. The multi-module overhead display assembly 1400 is supported by a mount system 1424.

It should be appreciated that a multi-module overhead display assembly may take on many other configurations. These configurations can be formed from different combinations of the base housing module 1000, the junction housing module 1100A, the junction housing module with corner bracket 1100B or the end housing module 1200, for example. Additionally, other sized and shaped housing modules could be arranged to interchange and connect with other compatible housing modules and still remain within the spirit of the embodiments disclosed herein.

Figure 21:
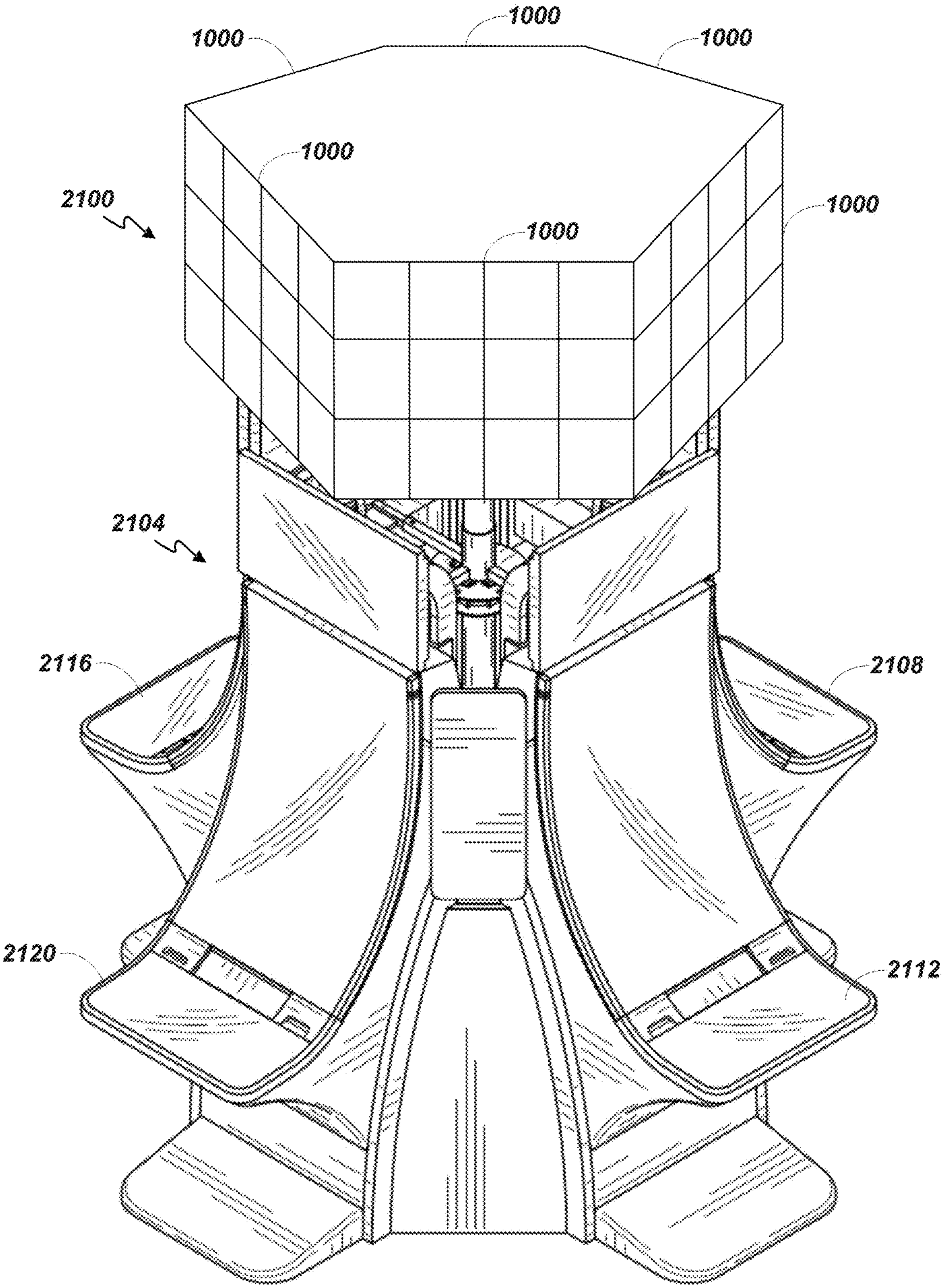
FIG. 21 illustrates an embodiment of a sixth bank of gaming machines in a back-to-back arrangement with a multi-module overhead display assembly on a mounting system in a back-to-back arrangement.

For example, FIG. 21 illustrates a multi-module overhead display assembly 2100 for a cluster or bank of gaming machines 2104. The multi-module overhead display assembly 2100 comprises six base housing modules 1000 of FIG. 10A with base housing module 1008 arranged so as to form a hexagonal shape. In this embodiment, the multi-module overhead display assembly 2100 is pivotably mounted on a mount system 2120 that may be rotated, manually or automatically, before, during or after game play. Additionally, in this embodiment, it is possible that the display boards or display panels 1004 of the multi-module overhead display assembly 2100 to align or not align with gaming machines 2008, 2012, 2016 and 2020.

Figure 22:
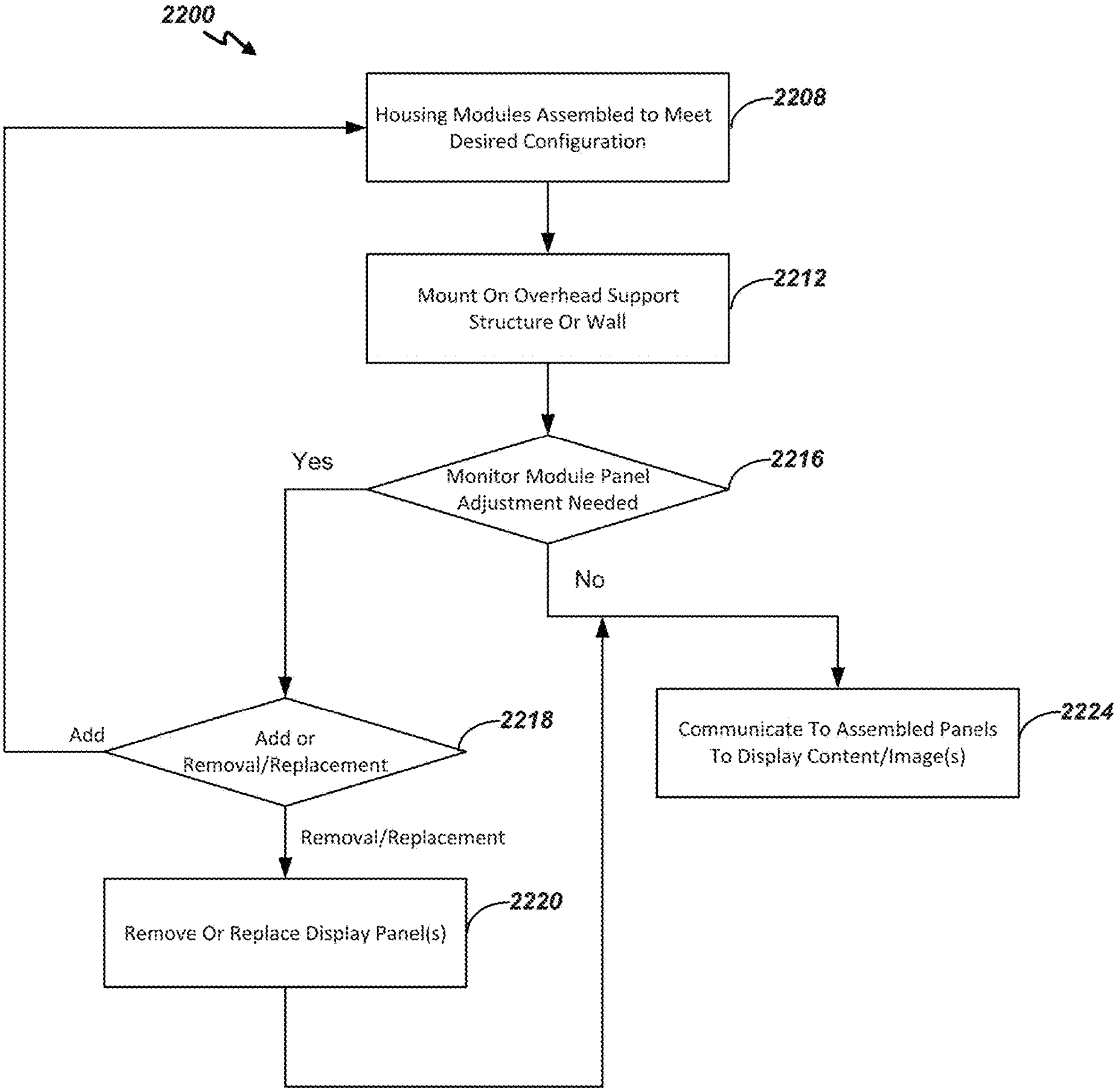
FIG. 22 illustrates a flow chart for assembly and maintenance of a multi-module overhead display.

FIG. 22 illustrates an overhead display assembling process 2200 for deploying a multi-module overhead display assembly 1600, 1700, 1800, 1900, 2000, or 2100, for example. As discussed above, unlike existing overhead signage where display panels have to be disassembled, repackaged, and shipped in order to accommodate a new design, the overhead display assembling process 2200 allows for easy installations, additions, or subtractions of a quantity of gaming machines or cabinets or housing modules, while maintaining a preferred size sand appearance of the existing overhead displays.

At step 2208, once the desired configuration is selected, the housing modules are assembled to meet the desired configuration. Specifically, a plurality of base housing modules 1000, junction housing modules 1100A, junction housing modules with corner bracket 1100B, end housing modules 1200, the end display modules, or the end banks 488, are releasably connected together in a unitary assembly. It is also contemplated that modules will be individually mounted above the game machines or banks of gaming machines and then joined together. The base housing module 1000, junction housing module 1100A, corner brackets 1100B, or end housing module 1200 may further include hanger rails 1040, depending on the mounting requirements.

At step 2212, the base housing module 1000, junction housing module 1100A, corner brackets 1100B, or end housing module 1200 of the multi-module overhead display assembly are mounted over the gaming machine or bank of gaming machines. The base housing module 1000, junction housing module 1100A, corner brackets 1100B, end housing module 1200, end housing modules 1200, the end display modules, or the end banks 488, alone or together, are mounted on a mount system, e.g. mount system 1824, or on a wall 1716.

At step 2216, the overhead display assembling process 2200 for deploying a multi-module overhead display allows for in-place module or display board panel adjustment, for example, via addition, subtraction, or replacement. The overhead display assembling process 2200 does not require that the entire mounted housing be disassembled, repackaged, and shipped when a modular multi-panel display is to be added. If the overhead display assembling process 2200 determines at step 2218 that a modular multi-panel display is to be removed or replaced ("Removal/Replacement" path), the modular multi-panel display is removed or replaced at step 2220. However, if the overhead display assembling process 2200 determines at step 2218 that a modular multi-panel display is to be added ("Add" path), the overhead display assembling process 2200 may repeat step 2204 through step 2216.

At step 2224, the modular multi-panel displays may be initiated to display game or non-game specific content and/or images. The game or non-game specific content and/or images may be displayed before, during or after game play and may or may not involve the game played.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A modular expandable signage system for a gaming system having a plurality of gaming machines, the modular expandable signage system comprising:

a track support system mounted adjacent the plurality of gaming machines and operable to releasably receive one or more modular overhead display modules and permit at least one of a translational and a rotational movement of the one or more modular overhead display modules when coupled;

a first modular overhead display housing pivotally coupled to the track support system and having a first plurality of display panels, a first lighting device secured about the first modular overhead display housing and having a first releasable electrical interface;

a second modular overhead display housing pivotally coupled to the track support system and releasably connected to the first modular overhead display housing, the second modular overhead display housing having a second plurality of display panels, a second lighting device secured about the second modular overhead display housing and having a second releasable electrical interface operable to be interfaced with the first releasable electrical interface at the first lighting device, and a controller operable to control the first modular overhead display housing, the second modular overhead display housing, the first plurality of display panels, and the second plurality of display panels.

2. The modular expandable signage system of claim 1, wherein the first modular overhead display housing comprises at least one base display module having the first plurality of display panels for displaying some or all of a content and an image, and the second modular overhead display housing comprises at least one end display housing having the second plurality of display panels for displaying some or all of the content and the image.

3. The modular expandable signage system of claim 2, wherein the first modular overhead display housing further comprises a mount panel releasably coupling the first plurality of display panels to the first modular overhead display housing.

4. The modular expandable signage system of claim 1, wherein the first plurality of display panels comprise one or more of a plurality of liquid crystal display panels and a plurality of light-emitting diode panels.

5. The modular expandable signage system of claim 1, further comprising a third modular overhead display housing pivotally coupled to the track support system and releasably connected to the second modular overhead display housing, the first modular overhead display housing, the second modular overhead display housing, and the third modular overhead display housing forming a unitary display assembly, the third modular overhead display housing having a third plurality of display panels, a third lighting device secured about the third modular overhead display housing and having a third releasable electrical interface operable to be interfaced with the second releasable electrical interface.

6. The modular expandable signage system of claim 1, wherein the second lighting device is daisy-chained to the first lighting device.

7. The modular expandable signage system of claim 1, wherein the first modular overhead display housing is mechanically and electrically connected to the second modular overhead display housing with at least one of a clip, fastener, and interlocking connector.

8. A gaming system comprising:

a plurality of gaming machines;

a track support operable to permit at least one of a translational and a rotational movement of one or more coupled modular overhead display modules;

a first modular overhead display housing positioned adjacent the plurality of gaming machines and pivotally coupled to the track support and having a first plurality of display panels and a first lighting device having a first releasable electrical interface and being secured about the first modular overhead display housing; and a second modular overhead display housing pivotally coupled to the track support and releasably connected to the first modular overhead display housing, having a second plurality of display panels and a second lighting device having a second releasable electrical interface coupled to the first releasable electrical interface, the second lighting device being secured about the second modular overhead display housing, and operable to control the first modular overhead display housing, the second modular overhead display housing, the first plurality of display panels and the second plurality of display panels.

9. The gaming system of claim 8, wherein the first modular overhead display housing comprises at least one base display housing having the first plurality of display panels operable for displaying some or all of a content and an image, and the second modular overhead display housing comprises at least one end display housing having the second plurality of display panels operable for displaying some or all of the content and the image.

10. The gaming system of claim 8, wherein the first modular overhead display housing further comprises a mount panel releasably coupling the first plurality of display panels to the first modular overhead display housing.

11. The gaming system of claim 8, wherein the first plurality of display panels comprise one or more of a plurality of liquid crystal display panels and a plurality of light-emitting diode panels.

12. The gaming system of claim 8, further comprising a third modular overhead display housing pivotally coupled to the track support and releasably connected to the second modular overhead display housing, the first modular overhead display housing, the second modular overhead display housing, and the third modular overhead display housing forming a unitary display assembly, the third modular overhead display housing having a third plurality of display panels and a third lighting device having a third releasable electrical interface coupled to the second releasable electrical interface, the third lighting device being secured about the third modular overhead display housing.

13. The gaming system of claim 8, wherein the second modular overhead display housing is daisy-chained to the first modular overhead display module housing.

14. The gaming system of claim 8, wherein the first modular overhead display housing is mechanically and electrically connected to the second modular overhead display housing with at least one of a clip, fastener, and interlocking connector.

15. A method of modularly extending a signage system adjacent a gaming system having a plurality of gaming machines, a track support mounted adjacent the plurality of gaming machines, the method comprising:

releasably receiving at the track support a first modular overhead display housing, a second modular overhead display housing, thereby permitting the first modular overhead display housing, and the second modular overhead display housing to configure translationally and rotationally, the first modular overhead display housing, and the second modular overhead display housing having a plurality of display panels, and lighting devices including respective electrical interfaces;

forming a unitary display assembly from the first modular overhead display housing and the second modular overhead display housing;

coupling a first electrical interface from a first lighting device to a second electrical interface at a second lighting device, thereby forming a continuous lighting device; and communicating from the first modular overhead display housing to the second modular overhead display housing for controlling the plurality of display panels.

16. The method of claim 15, wherein the first modular overhead display housing comprises at least one base display housing operable for displaying some or all of a content and an image, and the second modular overhead display housing comprises at least one end display housing operable for displaying some or all of the content and the image.

17. The method of claim 15, wherein the first modular overhead display housing further comprises a mount panel, and wherein the plurality of display panels comprise one or more of a plurality of liquid crystal display panels and a plurality of light-emitting diode panels, further comprising releasably coupling some of the plurality of display panels to the first modular overhead display housing.

18. The method of claim 15, further comprising releasably receiving at the track support a third modular overhead display housing, having a third lighting device and a third releasable electrical interface coupled to a second releasable electrical interface at the second modular overhead display housing, pivotally coupled to the track support and releasably connected to the second modular overhead display housing, and forming the unitary display assembly from the first modular overhead display housing, the second modular overhead display housing, and the third modular overhead display housing.

19. The method of claim 15, further comprising daisy-chaining the second modular overhead display housing to the first modular overhead display housing.

20. The method of claim 15, further comprising mechanically and electrically coupling the first modular overhead display housing to the second modular overhead display housing with at least one of a clip, fastener, and interlocking connector.

* * * * *